Sept. 17, 1968　　　　F. J. LUKETA　　　　3,401,477
ATTITUDE CONTROL OF TRAWL DOORS
Original Filed April 1, 1963　　　　　　　　　14 Sheets-Sheet 1
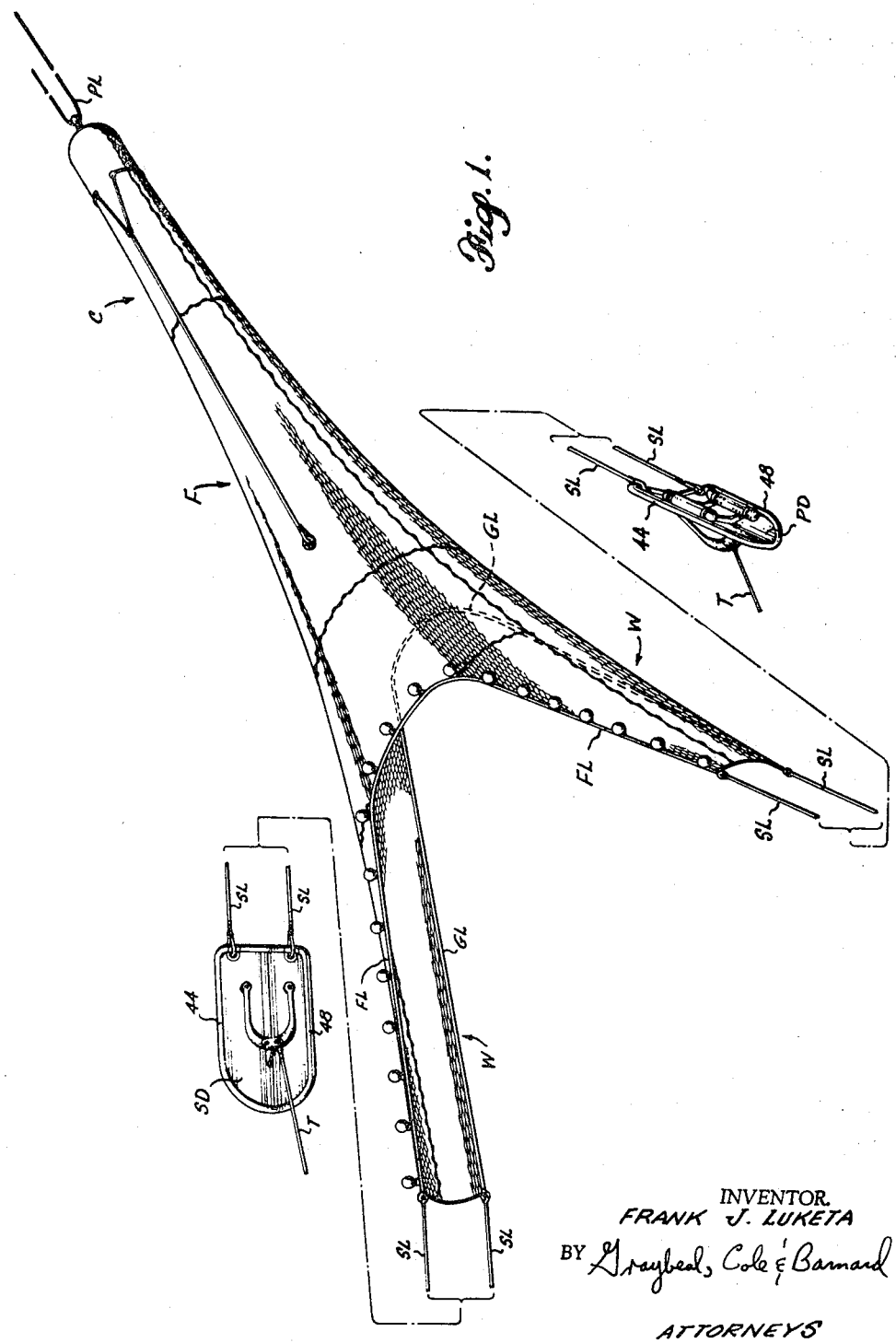
INVENTOR.
FRANK J. LUKETA
BY Graybeal, Cole & Barnard
ATTORNEYS Sept. 17, 1968 F. J. LUKETA 3,401,477
ATTITUDE CONTROL OF TRAWL DOORS
Original Filed April 1, 1963 14 Sheets-Sheet 2
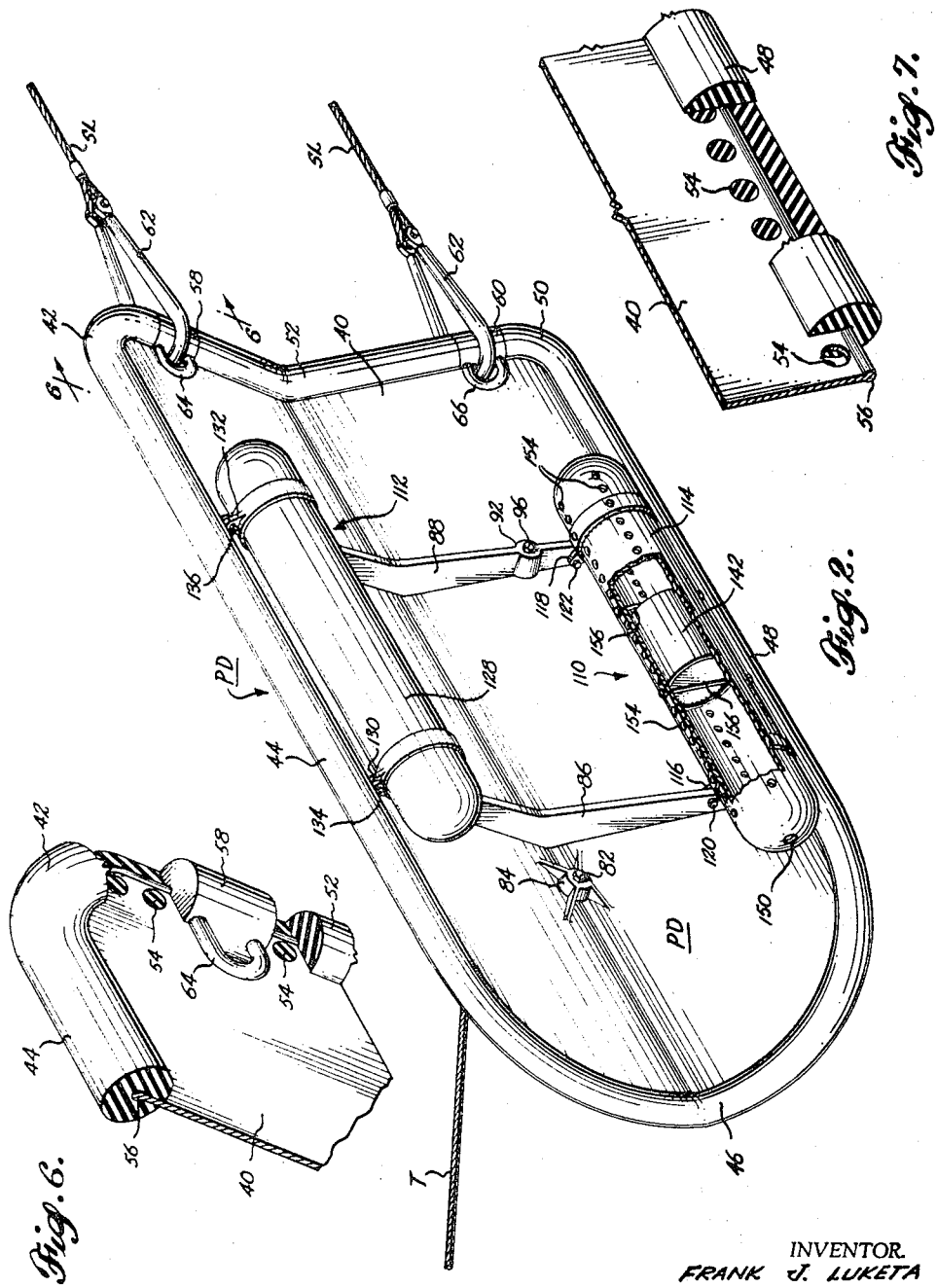
INVENTOR.
FRANK J. LUKETA
BY Graybeal, Cole & Barnard
ATTORNEYS

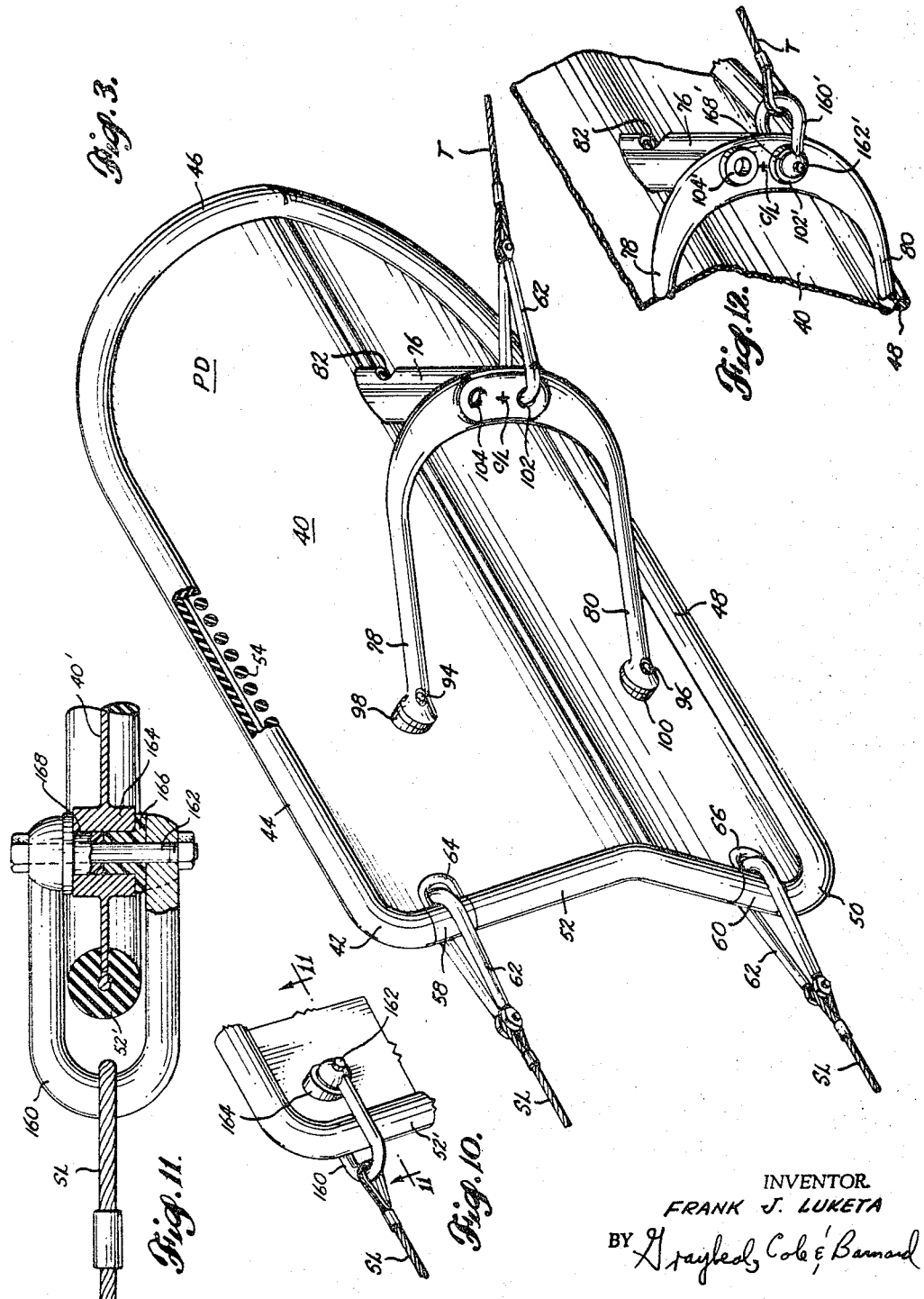

Sept. 17, 1968 F. J. LUKETA 3,401,477
ATTITUDE CONTROL OF TRAWL DOORS
Original Filed April 1, 1963 14 Sheets-Sheet 4
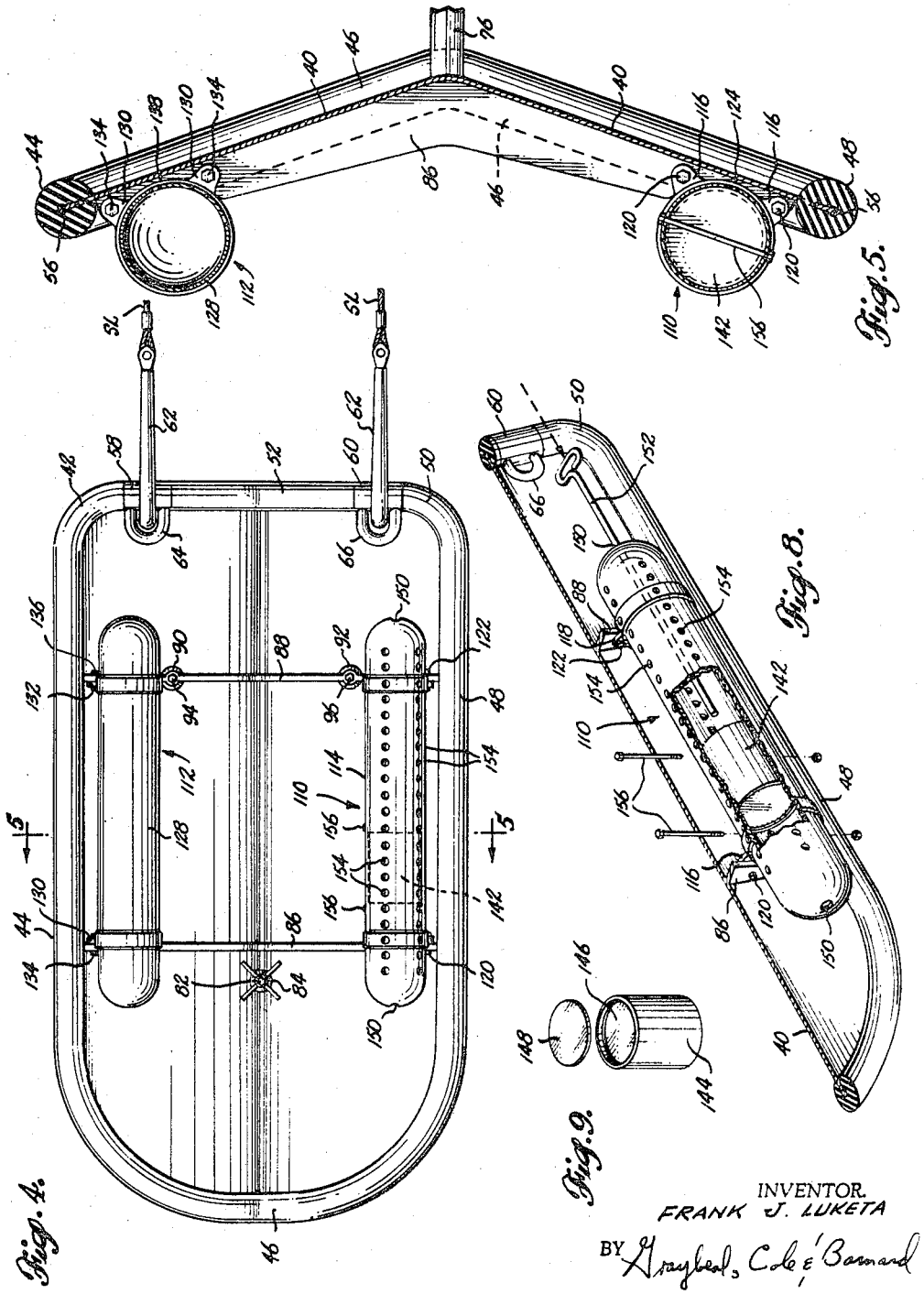
INVENTOR.
FRANK J. LUKETA
BY Grayheal, Cole & Barnard
ATTORNEYS

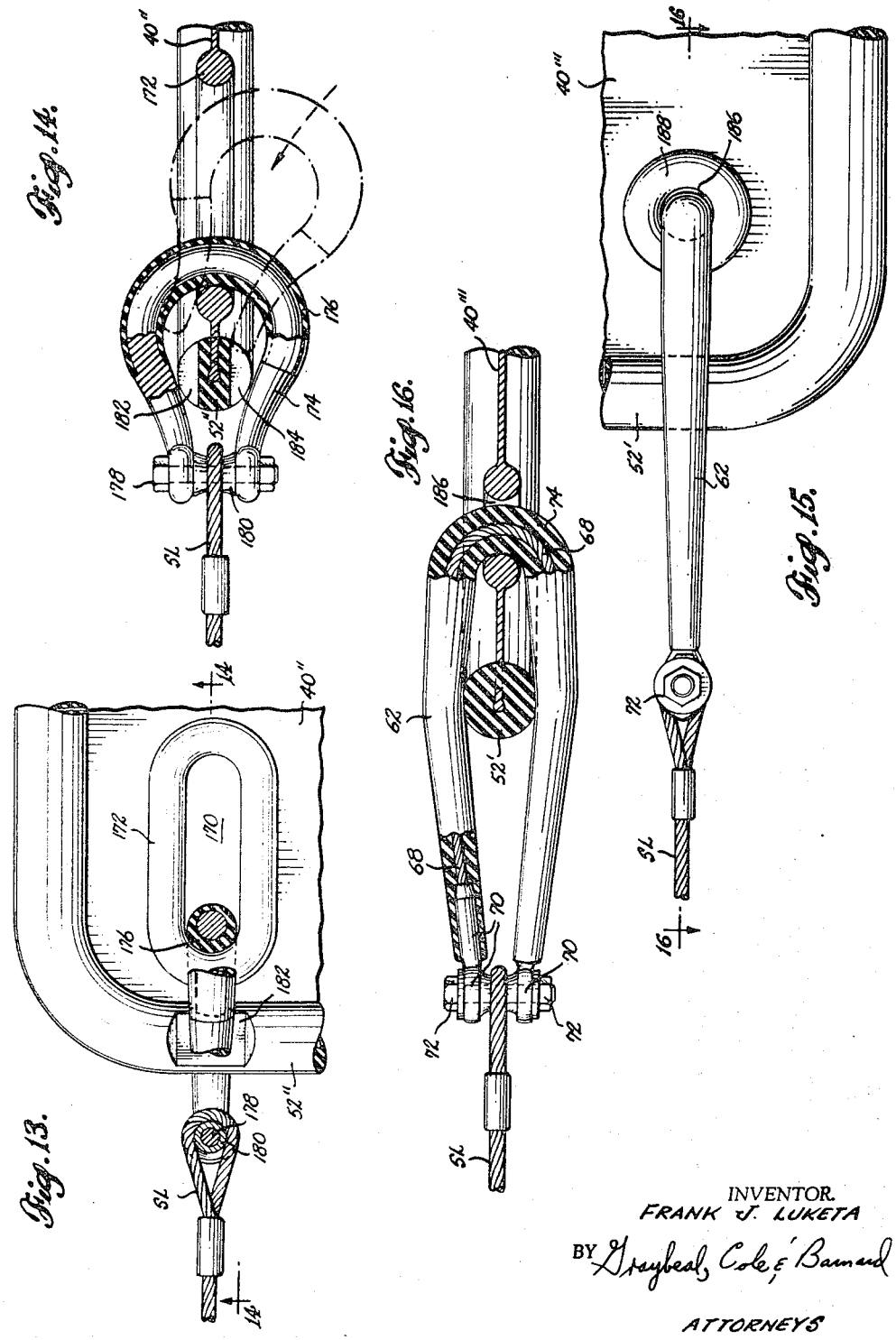

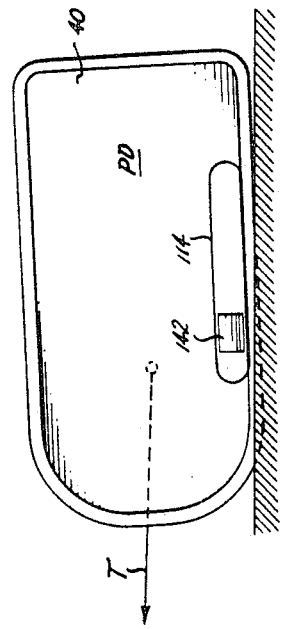
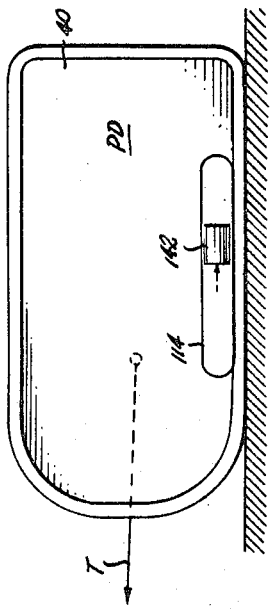
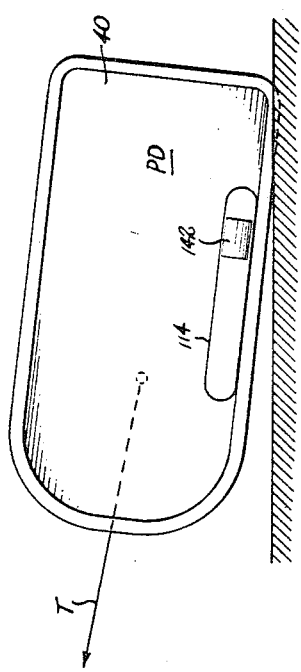
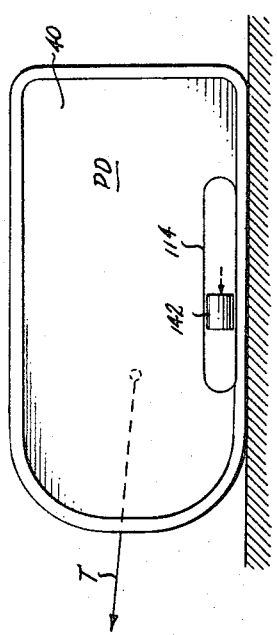
INVENTOR.
FRANK J. LUKETA

Sept. 17, 1968 F. J. LUKETA 3,401,477
ATTITUDE CONTROL OF TRAWL DOORS
Original Filed April 1, 1963 14 Sheets-Sheet 7
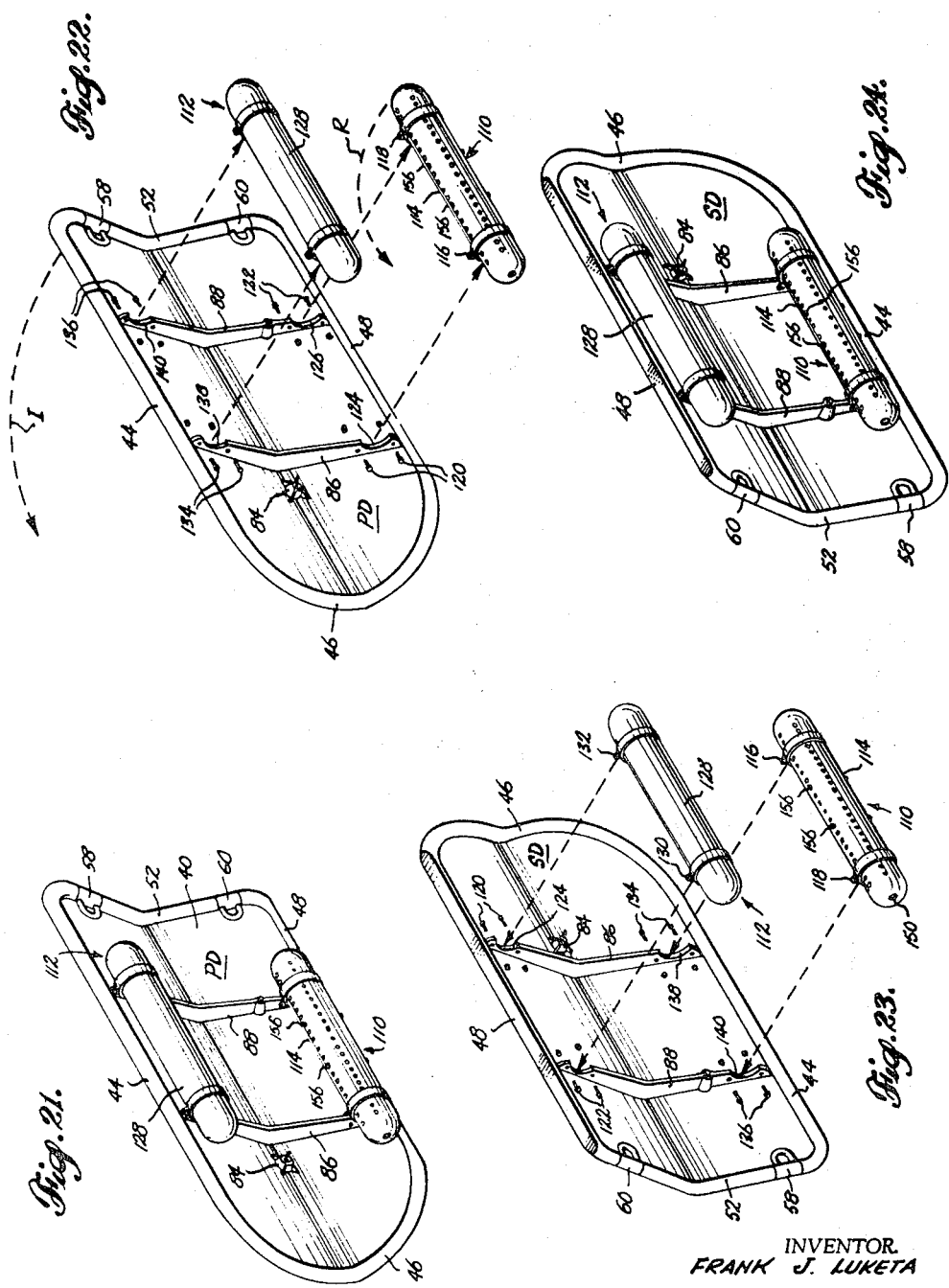
INVENTOR.
FRANK J. LUKETA
BY Graybeal, Cole & Barnard
ATTORNEYS Sept. 17, 1968  F. J. LUKETA  3,401,477
ATTITUDE CONTROL OF TRAWL DOORS
Original Filed April 1, 1963  14 Sheets-Sheet 8
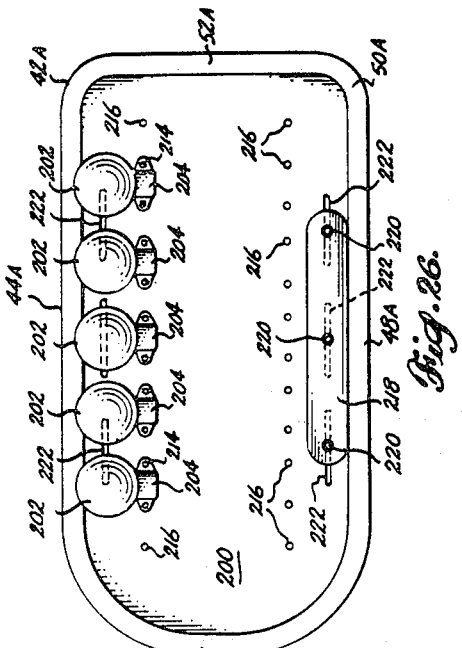
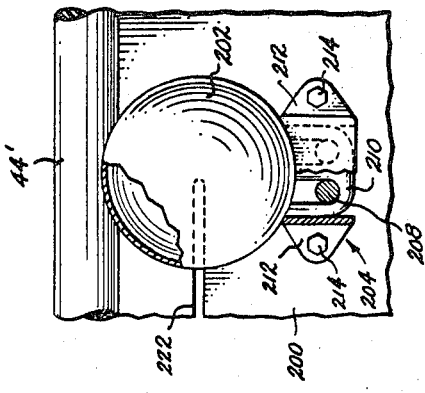
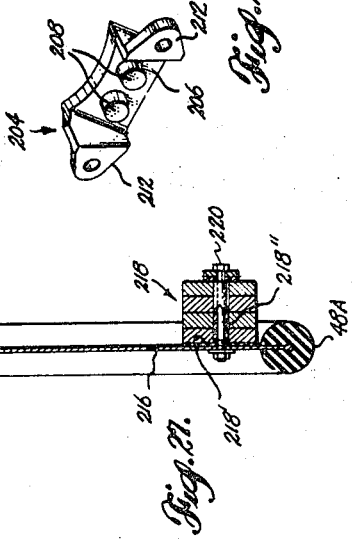
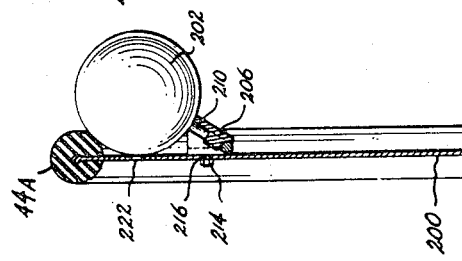
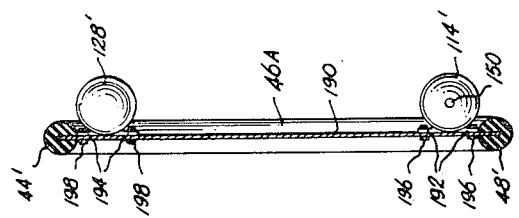
INVENTOR.
FRANK J. LUKETA
BY Graybeal, Cole & Barnard
ATTORNEYS Sept. 17, 1968     F. J. LUKETA     3,401,477
ATTITUDE CONTROL OF TRAWL DOORS
Original Filed April 1, 1963     14 Sheets-Sheet 9
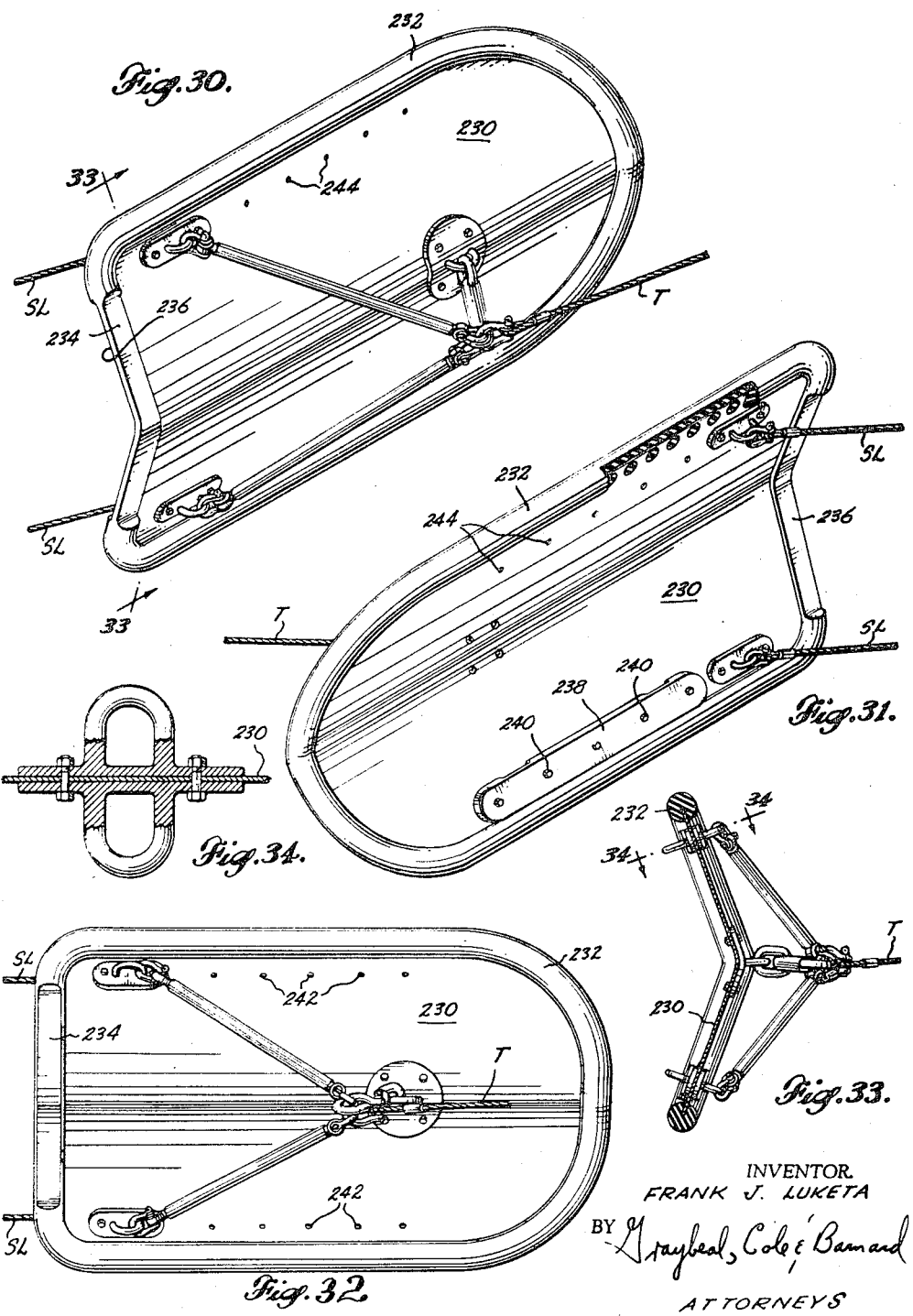

Sept. 17, 1968        F. J. LUKETA        3,401,477
ATTITUDE CONTROL OF TRAWL DOORS
Original Filed April 1, 1963        14 Sheets—Sheet 10
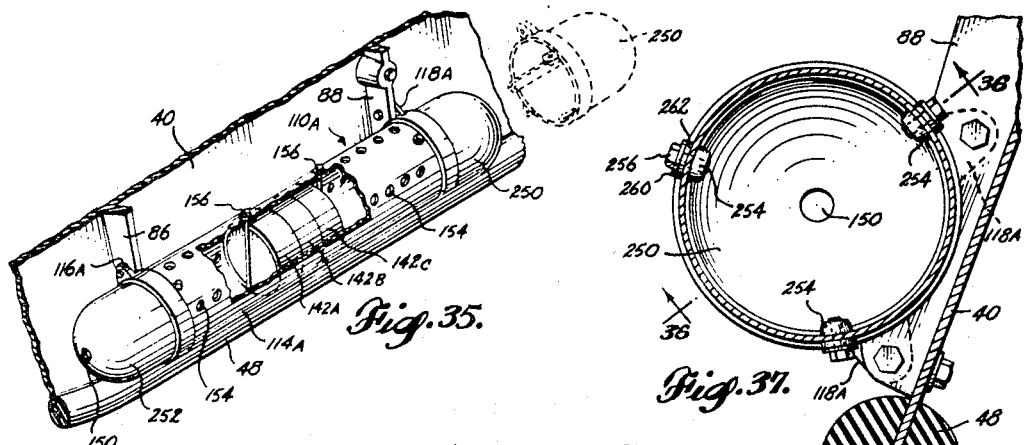
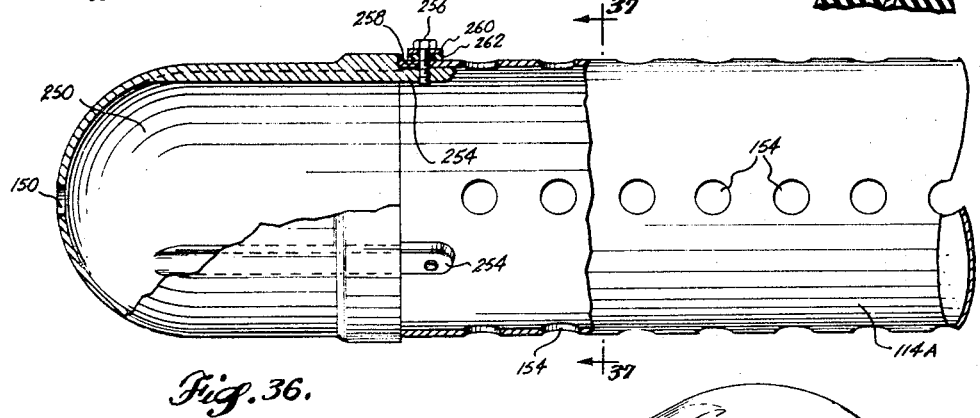
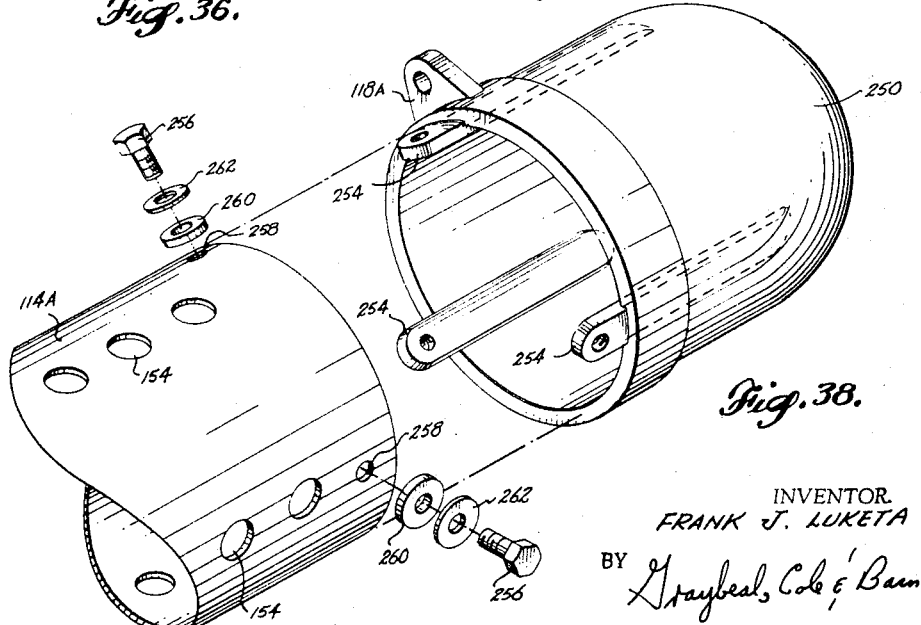
INVENTOR.
FRANK J. LUKETA
BY Graybeal, Cole & Barnard
ATTORNEYS

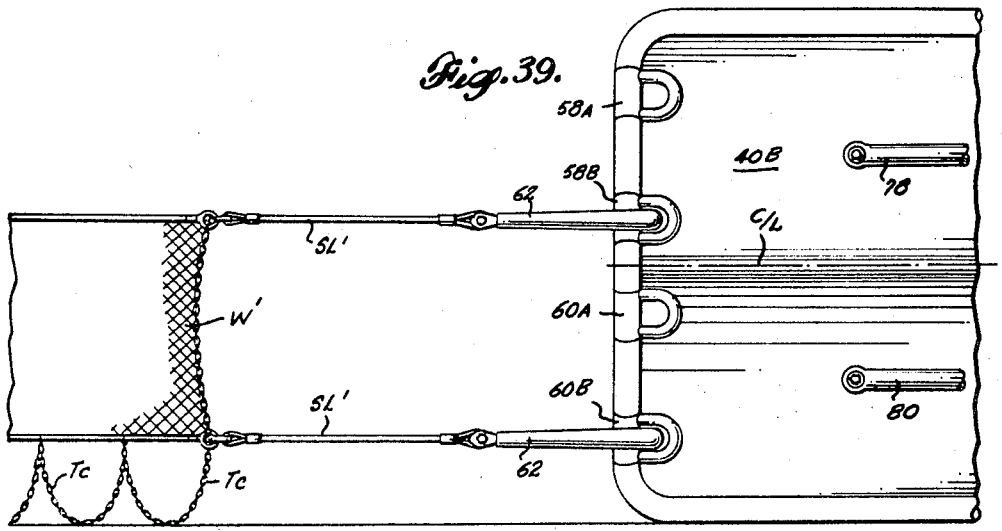
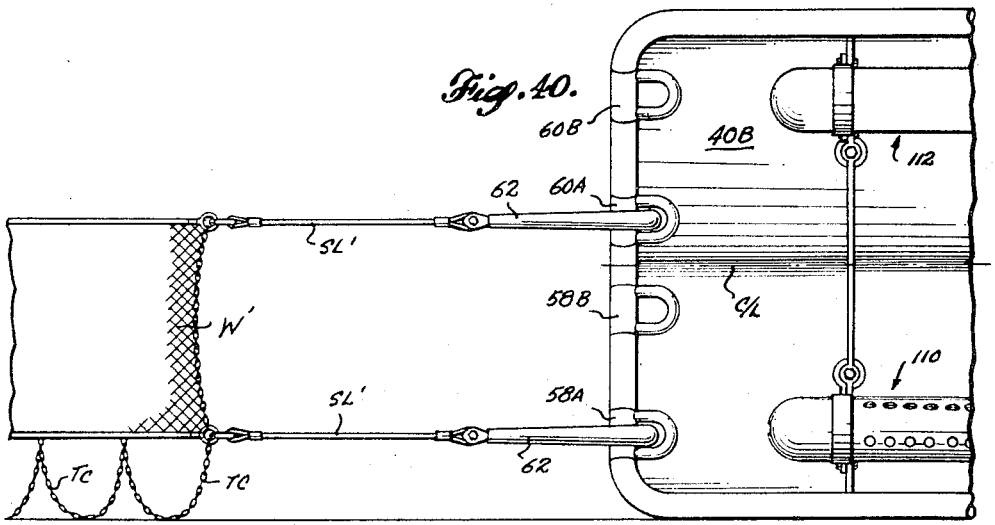

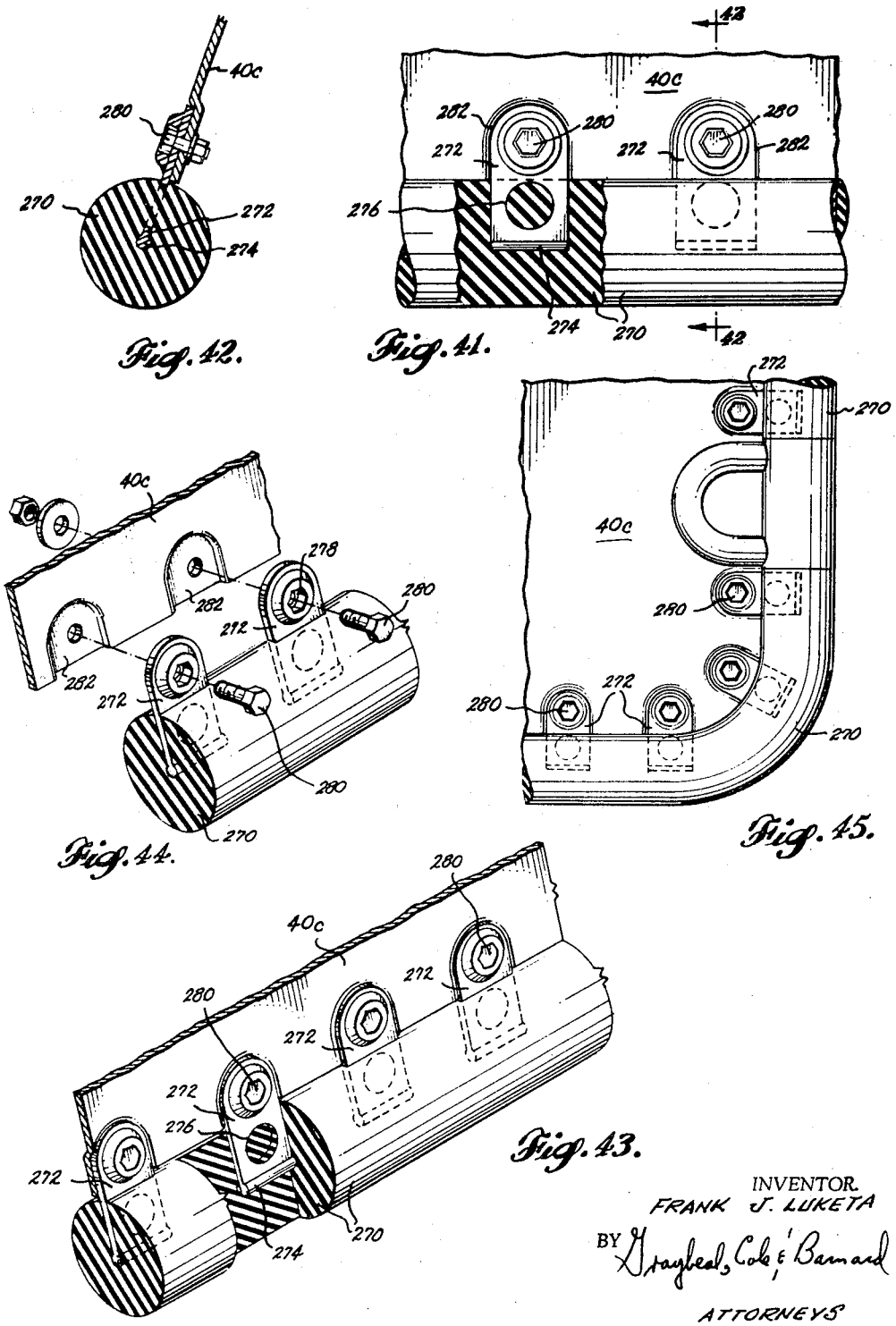

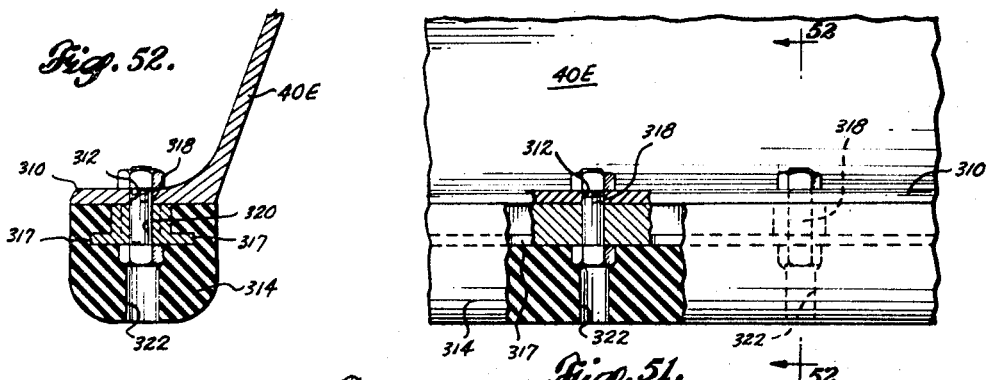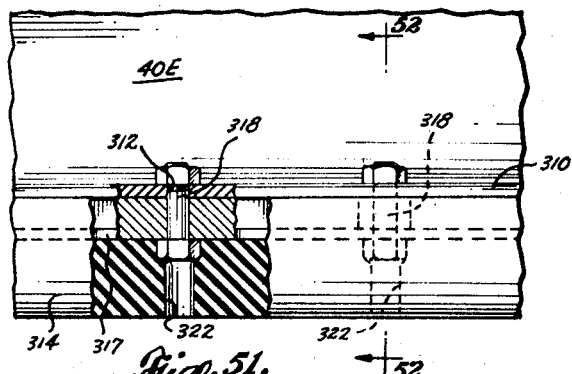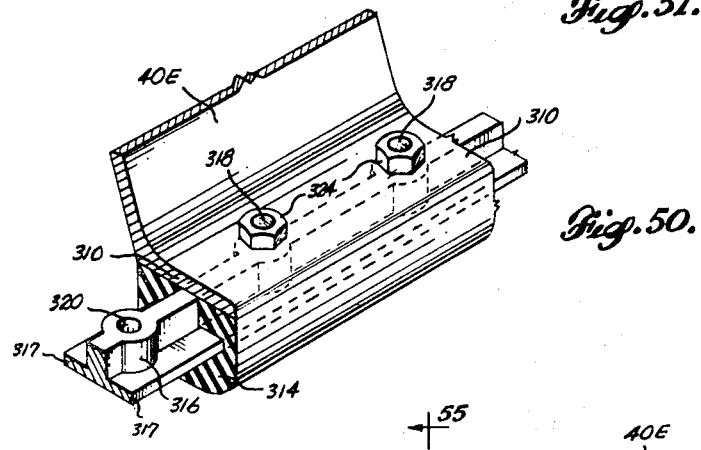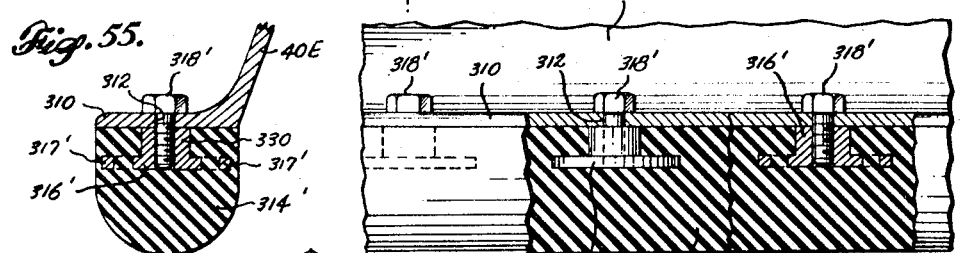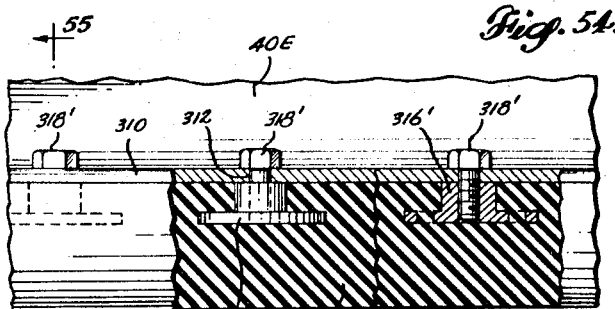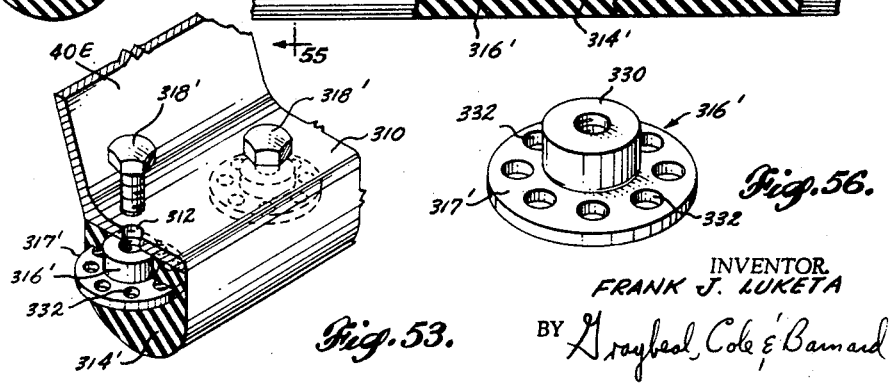

United States Patent Office 3,401,477
Patented Sept. 17, 1968

3,401,477
ATTITUDE CONTROL OF TRAWL DOORS
Frank J. Luketa, Seattle, Wash., assignor to Felix Robins & Robbins, Seattle, Wash.
Continuation of application Ser. No. 409,219, Nov. 5, 1964, which is a division of application Ser. No. 269,454, Apr. 1, 1963, now Patent No. 3,231,998, dated Feb. 1, 1966. This application Mar. 29, 1967, Ser. No. 641,403
24 Claims. (Cl. 43—4.5)

ABSTRACT OF THE DISCLOSURE

A trawl door comprising a thin metallic panel and a protective edging of an elastomeric or rubber-like material, and symmetrically constructed about a horizontal center line, rendering it invertible, and including a towing bridle having selectively usable towing wrap connections symmetrically located on opposite sides of its vertical center, and connections at or near its rear edge for sweep lines, and interchangeable buoyancy and ballast units, each selectively securable to the door immediately inwardly of the edging at both the upper and lower edges of the door; a buoyancy unit in the form of an elongated canister; a ballast unit comprising a canister of the same size and shape as the buoyancy canister, and including an interior weight that is longitudinally shiftable in position within such canister, and nut and bolt assemblies selectably insertable through selected diametrically opposed pairs of openings spaced longitudinally of the canister, for securing the weight in position.

Cross-reference to related applications

This application is a continuation of my now abondoned, copending application Ser. No. 409,219, filed Nov. 5, 1964 as a division of my prior application Ser. No. 269,454, filed Apr. 1, 1963, entitled Invertible Trawl Door With Adjustable Ballasting, and now Patent No. 3,231,998, issued Feb. 1, 1966. Application Ser. No. 269,454 is in turn a continuation-in-part of my now-abandoned application Ser. No. 210,433, and entitled V-Door For Trawling and Bridle Therefor, filed July 17, 1962, and is also a continuation-in-part of my now-abandoned application Ser. No. 52,140, entitled Multi-Section Trawl Door Construction, filed Aug. 26, 1960.

Background of the invention

Trawl doors of V-shaped lateral cross-section, with ballast means provided along the lower edge of the door, are disclosed in my prior U.S. Patent No. 2,816,385, issued Dec. 17, 1957, and prior U.S. Patent No. 3,048,936, issued Aug. 14, 1962, for example. Partly to improve hydrodynamic stability, ballasting means have been employed in such V-doors, specifically in the component of the door making up the bottom edge thereof which skids along the sea bottom when the door is in use. In such prior door designs, wearing away of the bottom edge of the door, which wear often occurs in an uneven manner, results in change of hydrodynamic characteristics of the door, but especially lessens the door's capability to stay on or "hold bottom" which is of the essence in bottom trawling, since loss of ballast weight to wear necessarily lessens the weight of the door and also could change its planning characteristics if the bottom edge wear were uneven in its fore and aft aspect. Compensating the loss of weight to wear by the addition of ballast weights along and just inboard of or in other words slightly above the lower edge of the door, as disclosed in my aforesaid Patent No. 3,048,936 is a partial solution to the problem but does not prevent the further loss of essential ballast and potential unbalancing of the door as a result of further wear along the bottom edge. In fact, this waering away or attrition of the vital ballast and its attending highly undesirable result is a continuing problem.

It has also been proposed, as in my aforesaid U.S. Patent No. 3,048,936, and in my now abandoned copending application Ser. No. 219,276, entitled Trawl Doors, and filed Aug. 24, 1962, to make a trawl door invertible by interchanging the components making up the respective upper and lower edges of the door. These prior arrangements for invertibility, however, involve either interchange of a relatively large number of door components, or interchange of elements, some of which are so worn as to function (such as for ballast) no better when relocated, so the problem giving rise to the necessity for the interchange (e.g. bottom wear) is not satisfied unless the components are replaced.

A further problem with respect to bottom ballasted trawl doors of prior design is that the ballasting means thereof is at least principally built into the bottom edge of the door and is thus not longitudinally adjustable of the door to compensate for varying conditions of use. Yet a further problem with respect to such prior door designs is that the ballast means thereof is of a dissimilar, heavier metal (e.g. steel), while the bulk of the door was of a lighter metal (e.g. aluminum), the dissimilar metals being directly exposed so as to be susceptible to electrolytic degradation.

Yet another disadvantage of prior door design is that the metal edging thereof, particularly the bottom or wear edge, was formed of metal, or at least principally of metal, so as to be relatively susceptible to wear when skidding along the bottom and encountering bottom obstacles. Metal, even though structurally relatively strong, is so rigid as to abrade and fracture relatively easy under scrapping and high stress.

Abstract of the invention

It is a principal object and feature of the present invention to provide a trawl door construction wherein the entire marginal edge of the door which may encounter underwater obstacles and which is subjected to wear is in the configuration of a relatively large bead composed of a wear-resistant relatively lightweight, resilient, cushioning material which is water-lubricated, which bead is composed of rubber or like elastomeric material having comparable resiliency and wear resistance. It is a related object and feature of the invention to form the rubber-like cushioning, wear-resistant bead around the marginal edge of the door by molding the bead onto the metal door panel in a manner so that the cushioning material is structurally interlocked with the panel, as by providing a series of peripheral holes in the metal panel, through which the cushioning material injects and bonds by intraconnection.

Another object and feature of the present invention involves the complete isolation of the edge components of the door affected by wear from the components of the door providing ballast and buoyancy functions. As a result of such isolation, the degree of wear generated in the door edge bead as a result of use, even protracted use, does not change the hydrodynamic characteristics of the door to any significant degree. The door is thus rendered hydrodynamically stabilized independent of wear, and it is a related feature and advantage of the present invention that such a hydrodynamically stabilized door is constructed so that the ballasting means and in certain instances also the buoyancy means thereof is readily adjustable so that should the bottom edge of the door be wearing unevenly under given use conditions, the effective center of gravity of the door can be changed in a compensating manner. In this respect, it is important to note the significant distinction between use of compensating ballast weights in a hydrodynamically unstable door where the effective center of gravity is affected by wearing away of the ballast means, and the situation where, as in doors according to the present invention, the door is hydrodynamically stable so that a developing unevenness in wear along the lower edge of the door is corrected by a selective change in the center of gravity. In the latter event the error (i.e. improper center of balance) which gave rise to the uneven wear is non-recurring under given operating conditions (which is the case when a trawler continues to operate at a customary speed and a customary towing warp scope), while in the former case the error giving rise to unevenness in wear is of a recurring nature.

Leveling of the door by my method, and maintenance of the door in a level attitude during use (that is, keeping the apex line of a V-sectional door, or the bottom edge or runner of a door of any configuration horizontal when towed), is accomplished under operating conditions by appropriate selective positioning of the longitudinally adjustable ballast means, rather than by reliance on a relatively close hookup of the towing warp anchorage point in relation to the center of lift, as in the case with the door design disclosed in my aforesaid U.S. Patent No. 3,048,936. In this respect, however, it is also to be noted that the improved bridle and towing warp hookup arrangement of the present invention retains all of the advantages of the earlier bridle arrangement in terms of utilizing a haul point slightly below the center line of the door to render the bottoming force a function of speed, i.e. the door is maintained in a substantially tilted attitude, laterally considered, so that the downward thrust on the upper panel portion is greater than the upward thrust on the lower panel portion.

A further object and feature of the present invention involves improved sweep line and towing warp hookup arrangements, including use of enlarged, rounded saddles forming a part of or placed contiguous to the rear edge of the door and receiving flexible eyes which are in turn connected to or form a part of the sweep lines, such saddles and eyes being relatively movable so that the sweep lines are at all times straight when under tension and pull points between the door and the sweep lines are substantially coincident with the rear edge of the door. As a related object and feature of these hookup arrangements, insulating means of rubber or like material are employed between the saddle and line eye core or between the door and saddle so that these components are not susceptible to electrolytic degradation even though constructed of dissimilar metals.

Yet another important feature and advantage of trawl doors according to the present invention is that the rubber or like door edging around all portions of the door coming into contact with the sea bottom engage and run over the bottom much more silently than when the door is metal edged. A silent running door, such as here presented, is much less likely to scare away the marine life in the path of the net being hauled and is therefore capable of significantly improving the catch. As a related object and advantage of the present door construction, certain forms of the sweep line and towing warp hookup arrangements for the door include flexible eyes or like components which are sheathed with rubber or like material at points of contact with the door so as to be more silent (i.e. not "creak") when the door is in use.

A further important feature and advantage of the cushioning, wear-resistant edge characteristic of doors according to the present invention is that the rubber or like edge thereof serves as a "bumper" and minimizes the likelihood of damage to the trawling vessel or to the door handling equipment thereof when the door is being hauled in or is on board the trawling vessel, as for stowage or rerigging.

These and other objects, features, advantages and characteristics of the present invention will be apparent from the following description of certain typical and therefore non-limitive embodiments thereof.

Description of drawing figures

In the drawing like letters and numerals refer to like parts and:

FIG. 1 is a small scale, somewhat fragmentary isometric view of a typical bottom trawl net, with the sweep lines thereof being spread and towed by trawl doors incorporating certain features of the present invention;

FIG. 2 is an isometric view on an enlarged scale of the port door shown in FIG. 1, with a portion of the ballast assembly broken away for clarity of illustration, the view being of the trailing or posterior side of the door;

FIG. 3 is an isometric view of the port door shown in FIG. 2, as viewed from the leading or anterior side thereof, with a portion of the cushioning and chafing edge cut away to show constructional detail;

FIG. 4 is a side view of the door shown in FIGS. 2 and 3, taken from the trailing side thereof;

FIG. 5 is a view in lateral cross-section and on an enlarged scale of the door shown in FIG. 4 taken substantially along line 5—5 thereof;

FIG. 6 is an enlarged fragmentary isometric view, taken substantially along line 6—6 of FIG. 2, with portions of the cushioning and chafing bead broken away to show constructional detail in the area of the upper sweep line saddle;

FIG. 7 is an isometric detail view on a enlarged scale, showing a typical segment of the panel edge and the cushioning and chafing bead molded thereon;

FIG. 8 is a fragmentary isometric view of the trailing side of the door shown in FIG. 2, with an exploded showing of the ballast capsule positioning and retaining bolts, and also showing a typical ballast capsule positioning device;

FIG. 9 is an exploded isometric view of the ballast capsule, illustrating the construction thereof;

FIG. 10 is a fragmentary isometric view of a modified form of sweep line hookup arrangement characteristic of the invention;

FIG. 11 is an enlarged detail view of the sweep line connection assembly shown in FIG. 10, taken substantially along line 11—11 thereof with certain parts further broken away to show constructional detail;

FIG. 12 is a fragmentary isometric view of a modified form of towing warp hookup assembly;

FIG. 13 is a fragmentary plan view, similar to the isometric view of FIG. 10, showing a further modified form of sweep line hookup arrangement, involving an elongated slot in the door panel just inboard of the rear marginal edge thereof, the view being with certain parts in cross-section for clarity of illustration;

FIG. 14 is a cross-sectional view of the sweep line hookup arrangement shown in FIG. 13, taken substantially along line 14—14 thereof;

FIG. 15 is a fragmentary plan view of a further modified form of sweep line hookup arrangement, involving a hole in the door panel just inboard of the rear marginal edge, and use of a flexible eye joined to the sweep line;

FIG. 16 is a cross-sectional view of the sweep line hookup arrangement shown in FIG. 15, taken substantially along line 16—16 thereof;

FIG. 17 is a schematic side view of a door incorporating an adjustable ballast means such as shown in FIG. 8, the schematic showing of FIG. 17 illustrating an operating condition where the center of gravity of the door is too far aft so that the rearmost portion of the lower marginal edge is consequently receiving the most wear;

FIG. 18 is a schematic view similar to FIG. 17, illustrating the manner of adjustment of the ballast means to correct the uneven wear occurring in FIG. 17;

FIG. 19 is a schematic view similar to FIG. 17, illustrating the occurrence of uneven wear in the forward portion of the lower edge of the door;

FIG. 20 is a schematic view showing the manner of correction of the wear condition showing in FIG. 19;

Figure 49:
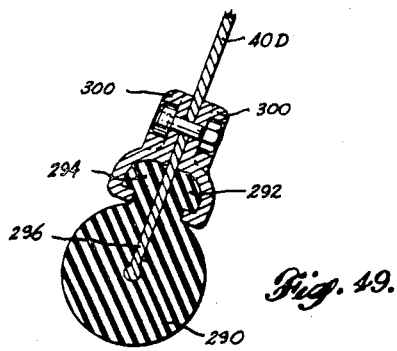

FIGS. 21–24 are isometric views illustrating the disassembly of a port door and reassembly thereof as a starboard door to illustrate the invertibility of the form of door which is illustrated at FIG. 2, FIG. 21 showing the door in the form used as a port door, FIG. 22 illustrating by exploded view the removal of the ballast and buoyancy assemblies and the top for bottom reversal of the door, FIG. 23 illustrating by exploded view the reassembly of the buoyancy and ballast assemblies onto the door panel, and FIG. 24 illustrating the reassembled door ready for use as a starboard door;

FIG. 25 illustrates in lateral cross-section a modified form of door utilizing the cushioned edge and utilizing buoyancy and ballast assemblies essentially like those employed in the form of door shown in FIG. 2, the door panel in the form of door shown in FIG. 25 being flat;

FIG. 26 is another form of door arrangement characteristic of the invention, the door panel in this instance being flat, the adjustable and invertible ballast means being in the form of stacked bars, and the buoyancy means being a series of trawl net floats;

FIG. 27 is a typical view in lateral cross-section and on an enlarged scale of the trawl door shown at FIG. 26;

FIG. 28 is a fragmentary detail view on a further enlarged scale, showing further constructional detail with regard to the buoyancy means of the form of door shown in FIG. 26, with certain parts broken away for clarity of illustration;

FIG. 29 is an isometric detail view of a float clamp as employed in FIGS. 26–28;

FIG. 30 is an isometric view showing the leading face of yet another form of door incorporating certain features of the present invention;

FIG. 31 is an isometric view of the door shown at FIG. 30 showing the trailing face thereof;

FIG. 32 is a plan view showing the leading face of the door shown at FIG. 30;

FIG. 33 is a view in lateral cross-section of the door shown at FIG. 30, taken substantially along line 33—33 thereof;

FIG. 34 is a detailed sectional view of anchorage eyes taken substantially along line 34—34 of FIG. 33.

Figure 48:
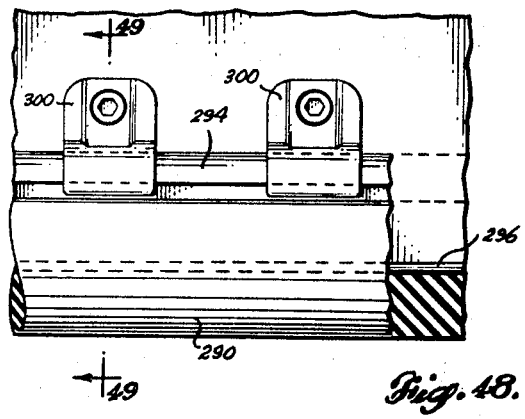
Figure 46:
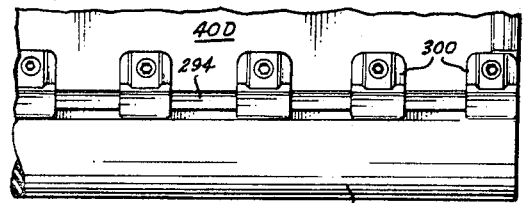
Figure 47:
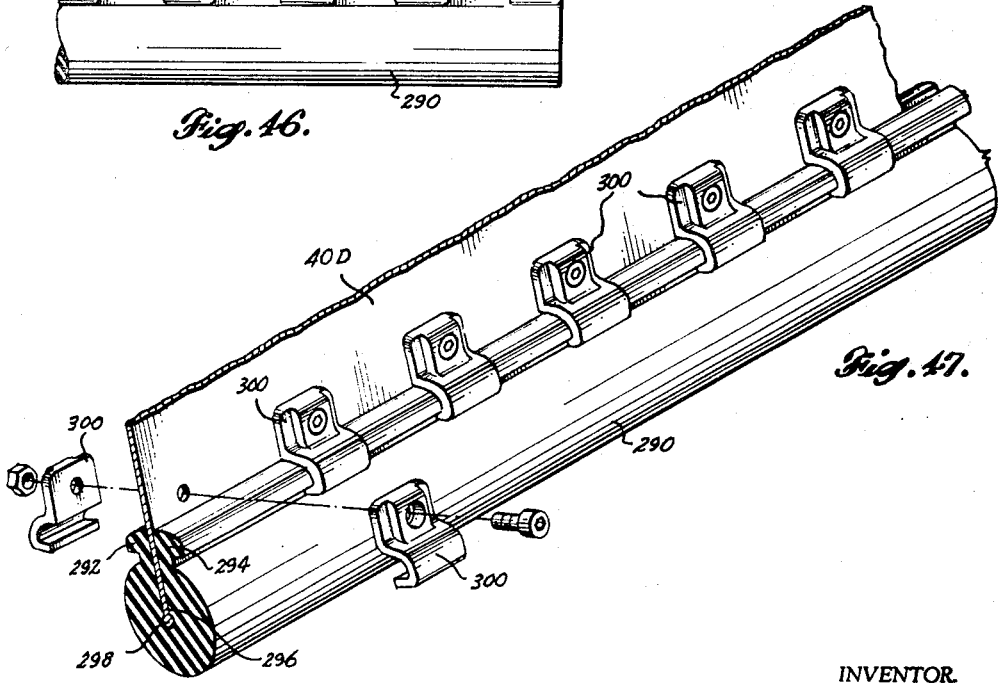

FIG. 35 is a fragmentary, isometric view with certain parts broken away, illustrating a modified form of canister type ballast means having a removable end cap and a plurality of ballast weights;

FIG. 36 is a view in side elevation and in section, showing a portion of a ballast canister shown in FIG. 35, the sectioned portions thereof being taken substantially along line 36—36 of FIG. 37;

FIG. 37 is a view in lateral cross-section of the canister shown at FIG. 36, being in part taken substantially along line 37—37 thereof;

FIG. 38 is an exploded isometric view on a further enlarged scale, showing additional detail with respect to the removable end cap of the ballast canister shown at FIGS. 35–37;

FIG. 39 is a fragmentary view in side elevation showing a modified form of door and sweep line hookup arrangement, involving alternatively used saddles;

FIG. 40 is a view similar to the view of FIG. 39, showing the sweep line hookup arrangement used in connection with the door shown at FIG. 39, with the door inverted;

FIG. 41 is a fragmentary view in side elevation, with a portion broken away for clarity of illustration, of a modified form of resilient edging and edging mounting arrangement;

FIG. 42 is a view in lateral cross-section, taken substantially along line 42—42 of FIG. 41;

FIG. 43 is an isometric fragmentary view further illustrating the type of resilient edging illustrated at FIGS. 41 and 42, and further detail as to the edging-to-panel interconnection;

FIG. 44 is an exploded isometric view similar to FIG. 43, further illustrating the edging mounting arrangement;

FIG. 45 is a side elevation view of a corner portion of a door incorporating the type of edging illustrated at FIGS. 41–44;

FIG. 46 is a view in side elevation of a modified form of resilient edging and panel-to-edging mounting arrangement;

FIG. 47 is an isometric view on an enlarged scale further illustrating the form of edging and mounting arrangemen illustrated at FIG. 46;

FIG. 48 is a view in side elevation and in section, further showing the panel and edging shown at FIGS. 46 and 47;

FIG. 49 is a view in lateral cross-section, taken substantially along line 49—49 of FIG. 48;

FIG. 50 is an isometric detail view of yet another form of construction involving a resilient edging mounted to a panel edge;

FIG. 51 is a view in side elevation of the panel edge and resilient edging shown at FIG. 50, with a portion thereof broken away for further illustration;

FIG. 52 is a view in lateral cross-section taken substantially along line 52—52 of FIG. 51;

FIG. 53 is a fragmentary isometric view of still another form of panel edge and rubber edging arrangement;

FIG. 54 is a view in side elevation of the modified form of the invention shown at FIG. 53, with certain portions broken away to show interior detail;

FIG. 55 is a view in lateral cross-section taken substantially along line 55—55 of FIG. 54; and FIG. 56 is an isometric detail view of one of the embedded anchor members shown in FIGS. 53–55.

Turning to a more particular consideration of the accompanying illustrations, FIG. 1 serves to illustrate a typical environment of use of trawl doors according to the invention. The showing of FIG. 1 is of a typical bottom trawling net comprised of a codend C closed by a purse line PL and joined to a funnel F from the forward end of which wings W diverge, the wings W being arranged between an upper float line FL and a lower ground line GL. The ends of the float line FL and ground line GL at the starboard side of the net are connected to sweep line means, involving either a single sweep line or an upper and lower pair of sweep lines SL (as shown) which in turn lead to and are hauled by a starboard door SD which planes out to starboard and along the sea bottom as the door is towed by towing warp T led from the trawling vessel, not shown. Similarly, the port ends of float line FL and ground line GL connect to sweep line means such as sweep lines SL led to a port door PD hauled by a towing warp T towed by the trawling vessel.

In general the present invention pertains to various constructional arrangements characteristic of the trawl doors SD and PD. In the first door embodiment illustrated, the port door PD being selected by way of example to show constructional arrangement and detail, it will be observed in FIGS. 2–9 that the door comprises a metal panel 40, which in lateral cross-section is of a dihedral or shallow V configuration with symmetrical panel portions above and below an apex line or crown, the upper and lower portions of the panel 40 being swept back substantially on its leading face, the panel portions having an angle therebetween of about 140° on the trailing face of the door. Panel 40 is preferably of aluminum construction and may be either cast (e.g. in the case of relatively small doors) or fabricated from sheet stock (e.g. in the case of relatively large doors). The forward portion or nose of the door is of a rounded configuration and the trailing edge thereof is squared off, with slightly rounded corners; however, as will be apparent, the configuration of the door outline can be varied considerably as desired.

A rounded, marginal edge or bead of cushioning, abrasion resistant, lightweight material such as cured rubber extends around the nose and sides of the panel, as shown at 42, 44, 46, 48, 50. This marginal edge is preferably although not necessarily continuous, and is often simply hereinafter termed the wear edge or rubber edge. For purposes of particular reference to certain portions of the rubber or like marginal edge in the following discussion, various portions thereof have been separately designated in the accompanying illustrations, edge portion 42 being the portion extending around the rounded upper rear corner of the panel 40, edge portion 44 being the straight portion along the upper edge of the panel 40, edge portion 46 being the curved portion thereof around the nose of the panel 40, edge portion 48 being the straight portion along the bottom of the door panel 40, and edge portion 50 being that portion around the rounded lower rear corner of the panel 40. In addition to the edge portions indicated, the door marginal edge further comprises a rear edge 52 which is also formed of a rounded, lightweight, cushioning material and is suitably of identical cross-section and constituency as the edge portions 42–50.

The rubber or like edging 42–52 is suitably affixed to the edge of the panel 40. A particularly advantageous manner of interconnecting the edging with the panel 40 is illustrated in the accompanying figures and involves fabrication of the panel 40 with a series of near edge holes, certain of which are indicated at 54 in FIGS. 3, 6 and 7, for example, with the edging 42–52 being pressure molded and cured in situ around the panel 40 so as to intrabond through the holes 54 and thereby be structurally integrated with the panel 40 by mechanical interconnection. The peripheral edge of the panel 40 is preferably also cross-sectionally enlarged to improve the panel-to-edging interconnection and to present a blunt edge to prevent interior cutting of the rubber as the resilient edge flexes in use, such as indicated at 56.

As best shown in FIGS. 2 and 6, the rear edge areas 58, 60 of the panel 40 between the respective ends of the edging portions 42, 50 and the ends of edge portion 52 are of a cylindrical configuration and cross-sectionally identical to the edge portions 42, 50, 52. However, for purposes of mechanically strong interconnection of the door panel 40 to the sweep lines SL, these edge portions 58, 60 are constructed of metal (being preferably integrally formed with the panel 40) and provide what may be termed saddles or saddle means which serve as anchor points for the flexible eyes 62 at the ends of the sweep lines SL, the portions of the panel 40 immediately inboard of the saddle means 58, 60 being cut out and preferably provided with enlarged edge beads 64, 66 to minimize wear on the flexible eyes 62. Placement of the saddle means 58, 60 coaxially of the adjacent edging portions 42, 50, 52 places the lines of pull of the sweep lines in substantially intersecting relationship with the rear edge of the door. Further, the rounded surface of the saddle means 58, 60 provide that the flexible eyes 62 are free to move in any attitude angularly with respect to the door so that the door has a considerable freedom of movement with respect to the sweep lines hauled by the door.

One of the flexible eyes 62 is illustrated on an enlarged scale in FIG. 16. As shown in said FIG. 16, the flexible eye 62 comprises a steel cable core 68 onto the ends of which swage socketed eyes 70 are installed. Eyes 70 receive a connecting bolt 72 passed through the looped end of sweep line SL. The flexible cable 68 and the swage sockets of eyes 70 are covered by a rubber-like wear resistant, insulating sheath 74. The insulation provided by sheath 74 isolates the aluminum door panel 40 and the steel members such as cable 68 used in the sweep line hookup from electrolytic degradation. The sheath 74 further functions to present a resilient thrust bearing surface to the saddle and thus minimizes rigging noise when the door is in use.

The bridle assembly to which the towing warp T is anchored is mounted on the leading face of the door and in the preferred form of door shown in FIG. 3 comprises a forward leg or strut 76 and upper and lower rear legs 78, 80, respectively. The trawl door illustrated employs a rigid, three-legged form of bridle arrangement; however it is to be understood that any suitable type of bridle can be employed, such as the bridle arrangement disclosed in my aforesaid U.S. Patent No. 3,048,936 and employed in the modified form of the present invention as illustrated at FIGS. 30–34 and discussed below, and such as the form of bridle arrangement disclosed in my prior U.S. Patent No. 2,816,385, simply by way of further examples. In the specific form of bridle assembly shown at FIG. 3, the bridle assembly is preferably fabricated or cast of aluminum and the forward leg 76 thereof is attached as by bolt 82 to the panel 40 at a point laterally centrally placed on the panel and well forward of the center thereof, longitudinally considered. A stiffening boss 84 on the trailing side of the panel 40 (FIG. 2) receives the bolt 82. Stiffening ribs 86, 88 extend laterally of the panel 40, and the after stiffening rib 88 includes laterally offset bosses 90 and 92 (also note FIG. 4) receiving respective anchor bolts 94, 96 for the bridle rear legs 78, 80, the forward face of panel 40 being also provided with two laterally offset bosses 98, 100 providing coplanar faces for the ends of the respective legs 78, 80.

In the manner characteristic of the bridle arrangements disclsoed and claimed in my aforesaid U.S. Patent No. 3,048,936, the bridle arrangement shown at FIG. 3 is hooked up to the towing warp T at a point downwardly offset from the center plane of the panel 40 in order that the door in use is tilted substantially outwardly so that the water thrust against the upwardly facing panel portion is greater than the thrust against the downwardly facing panel portion (i.e. tilted in the manner shown in FIG. 12 of said Patent No. 3,048,936). For this purpose, when the door is being used as a port door as shown at FIG. 3, the hookup to the towing warp T is to an anchor eye 102 laterally offset below (as shown in FIG. 3) the horizontal center line (designated C/L) of the door, the specific hookup shown being by means of an insulated flexible eye 62 (which is constructionally like and in fact interchangeable with the sweep line hookup flexible eyes 62 previously discussed), so that there is insulation from electrolytic degradation as between the aluminum bridle assembly and the steel towing warp T. A reversely offset anchor eye 104 is also provided for use as the hookup point for the towing warp T when the door is inverted for use as a starboard door, as more fully discussed below in connection with FIGS. 21–24.

The bridle assembly shown at FIG. 3, for example, offers various advantages over prior bridle assemblies, in that it stands out substantially from the anterior face of the panel 40, and has no moving parts so does not wear at points of interconnection Further, its anchor eyes 102, 104 are strongly braced and readily accessible, and the entire bridle assembly is hydrodynamically "clean."

As earlier indicated, it is a significant feature of the trawl doors here presented that the ballast means of the door is separate from the portion of the door encountering wear. It is also a feature of certain of the ballasting means here presented that the ballasting means is adjustable longitudinally of the door to suitably shift the center of gravity thereof so that the wear on the door lower edge is evened. It is a further feature of certain of the present door arrangements that the ballasting means is used in conjunction with a laterally opposed buoyancy means, the ballast means and buoyancy means being interchangeable so that door can be readily inverted for use on the opposite wing of a net.

All of these features pertain to the form of door illustrated at FIGS. 1–9. More specifically, this form of door comprises a ballasting means, generally indicated at 110, and a buoyancy means, generally indicated at 112. Each of the means 110, 112 is externally configured like the other and quickly attachable and removable from the trailing edge of the door inboard of the edges thereof. In the form shown, the ballast means 110 comprises a generally cylindrical, rounded end canister 114, bolted fore and aft to the stiffening ribs 86, 88, the bolting arrangement involving external lugs 116, 118 on the canister 114 through which respective bolts 120, 122 pass. Suitable holes to receive said bolts are provided in the stiffening ribs 86, 88, and said stiffening ribs are preferably recessed to cradle the canister 114 when in attached position, the cradling contour thereof being indicated at 124, 126, respectively (see FIGS. 22 and 23). Similarly, the buoyancy means 112 comprises a sealed canister 128 of generally cylindrical, rounded end configuration, provided with respective fore and aft lugs 130, 132, attached by bolts 134, 136 through holes in the ribs 86, 88 so as to be cradled against the respective recessed portions 138, 140 of the stiffening ribs 86, 88.

As best seen in FIGS. 2 and 8, the ballast means 110 comprises a movable weight 142, suitably in the general configuration of a cylinder of a diameter to more or less sungly fit within the ballast canister 114. As shown in the exploded detail view of FIG. 9, the weight 142 can suitably be fabricated from an aluminum can 144 in which molten lead is poured to form a lead slug 146, the slug 146 being sealed within the can 144 by an aluminum cap 148 suitably sealed into the mouth of the can 144, as by welding, to prevent electrolytic action between the lead and aluminum when submerged in water. The resulting ballast weight 142 is placed within the ballast canister 114 during the assembly of the canister (i.e. before one rounded end cap thereof is welded in place) so that the balast canister 114 and ballast weight 142 present a compact, self-contained ballasting unit.

Positioning of the ballast weight 142 longitudinally within the canister 114 (and accordingly longitudinally of the door when the canister 114 is in place) is facilitated by end access holes 150 in the ballast canister 114, through which a positioning rod 152 can be inserted (note FIG. 8) to change the position of the ballast weight 142.

Multiple rows of holes, which are indicated at 154, extend radially into the canister 114 to allow flooding of the canister. Selected opposed pairs of such holes 154 also serve to receive a pair of positioning bolts 156 which secure the ballast weight 142 in desired position within the canister. Preferably, the bolts 156 are tightened sufficiently to pinch the canister 114 against the weight 142 so that the latter is firmly retained without relative movement in the canister.

FIGS. 10 and 11 serve to illustrate a slightly modified form of saddle arrangement for connection of the sweep lines SL to the rear edge area of the door. As shown in FIGS. 10 and 11, this arrangement involves a modified form of steel saddle 160, the return bend portion of which is encircled by the eye of the sweep line SL. The forward ends of saddle element 160 are retained by a bolt 162 passing through a boss 164 just forward of the rear edge of the panel 40', with flanged nylon or like inserts 165, 168 serving to insulate the saddle 160 from the door panel 40'. The form of sweep line hookup arrangement shown at FIGS. 10 and 11 has an advantage similar to the earlier discussed sweep line hookup arrangement in that the sweep line point of thrust is placed substantially at the rear edge of the door, and is further advantageous from the point of view that the full extent of the rubber or like edging provided at the rear edge of the door panel can be continuous, as indicated at 52'.

FIG. 12 illustrates a slightly modified aluminum bridle construction. In this arrangement, the selected anchor eye 102' or 104' provided in slightly offset relation from the center line CL in the juncture area of forward legs 76 and rear legs 78, 80 is connected to the towing warp T by means of a steel shackle 160' which connects to the selected eye 102' or 104' in like manner as the saddle 160 connects to the holed boss 164 shown in FIG. 11, i.e. by a bolt 162' which is insulated from the bridle eye by means of insulative, nylon or like flanged inserts, the edge of one of such inserts being shown in FIG. 12 at 168'. As will be apparent, the steel shackle 160' and its bolt 162' are thus insulated from electrolytic degradation.

FIGS. 13 and 14 illustrate a further modified form of sweep line hookup arrangement wherein the door panel 40" is provided with a continuous rear edge 52" and a longitudinally elongated slot is provided in the panel 40" just inboard of the rear edge. Slot 170 is provided with an enlarged edge bead 172, the elongated nature of the slot 170 being to enable installation of a shackle 174 (the manner of installation of which is shown in phantom in FIG. 14). The shackle 174 in its return bend portion is provided with a rubber or like sheath 176 which cushions and insulates the bearing engagement of shackle 174 with the rear portion of the enlarged slot edge 172, the latter functioning as a saddle in this arrangement in that its relation to the end of the sweep line SL through shackle 174 is directly comparable to that of the saddle elements 58, 60 in bearing engagement with the flexible eyes 62 at the ends of the sweep lines, as discussed in the form of sweep line hookup shown at FIGS. 2 and 3, for example.

As will be apparent in FIGS. 13 and 14, the shackle 174 is provided with a bolt 178 and spool 180 to connect same with the eye at the end of the sweep line SL. To facilitate the installation of shackle 174, the rubber or like rear edging 52" is provided with insert or cut out portions 182, 184 immediately rearwardly of the slot 170

FIGS. 15 and 16 illustrate yet another variation in sweep line hookup arrangement, the arrangement in this instance involving a rubber or like covered flexible eye 62 of the type previously discussed, the eye 62 passing through a hole 186 in panel 40''' at a point just inboard of the rear edging 52' of continuous rubber or like construction, the hole 186 being provided with an enlarged edge 188 serving in its rear portion as the saddle element for the flexible eye 62.

FIGS. 17–20 collectively present schematic side views of a door characteristic of the invention (the type shown at FIGS. 2–9 being selected for purposes of illustration), and serve to illustrate certain considerations with respect to the adjustable ballast means afforded by the invention. In FIG. 17, a condition of use is illustrated wherein a port door PD is riding predominantly "nose up" so is receiving undue wear on the rear part of the bottom edge. Excessive wear at the rear of the bottom edge is of course indicative of the operational center of balance of the door, as influenced in part by the upward moment arm exerted by the towing warp T, being too far aft, and the indicated selective adjustment is to move the ballast weight 142 from the position shown in FIG. 17 to the position thereof shown in FIG. 18.

The converse condition where the door bottom edge is receiving excessive wear in its forward portion is illustrated in FIG. 19. Upon encountering this condition, the corrective adjustment is to move the ballast weight 142 to a more rearward position within a ballast canister 114, as indicated at FIG. 20.

As will also be understood in the art to which the invention is addressed, the attitude of the door when planing along the sea bottom is substantially a function of bottom depth and length of towing warp (i.e., "scope"), and also a function of towing speed. Operational variation of any of the relevant factors affecting the planing attitude of the door can affect the manner in which the door rides along the sea bottom. Since it is oftentimes desirable or necessary to accommodate the trawling gear to changes in trawling speed and/or changes in towing warp "scope," it is very desirable to have readily adjustable ballasting means to compensate for changes in manner of use of the door, and it is a fundamental object and purpose of the present invention to provide a trawl door having such capabilities. Furthermore, since a door in order to be produced at reasonable cost should be standardized as much as possible, this inherent leveling capability is essential. As a case in point, in the fleet of several thousand shrimp trawlers in the Gulf of Mexico, there are for various reasons, wide variations in towing speeds, towing warp scopes, and also in net sizes and types. The present invention enables each skipper to adjust his door ballasts to suit requirements, simply by changing position of the ballast weight on each door, and/or using interchangeable ballast canisters equipped with lighter or heavier weights, as desired.

In regard to the ballasting weight itself, it will be noted in the door of FIGS. 2–9 that the weight 142 is of compact length and of dense material (lead); this makes for a much broader range of effective leveling capability. This capability gives rise to the possibility of designing a self-leveling door with a level-state sensor controlling the operation of a ballast positioning mechanism. The compact ballast weight of this invention is highly advantageous in such an arrangement, attaining quick response as well as a wide range of leveling response.

Another important feature of the trawl doors here presented is their capability of being readily inverted without necessity for changing any edge components and without having to make any corrective adjustment as to ballasting. The manner of inverting the form of door illustrated at FIGS. 2–9 is shown by FIGS. 21–24 (simply by way of example). In FIG. 21, the door comprising panel 40 is configured as a port door PD, with the ballast means comprising canister 114 being in a lower position (as shown) and the buoyancy canister 128 in an upper position, the marginal edge 40 being the bottom engaging edge and the marginal portion 44 being the upper edge. As sufficient wear develops along the lower edge 48 of the door PD to necessitate inverting thereof, the respective ballast and buoyancy canisters 114, 128 are removed by removal of the various bolts 120, 122, 134, 136, the removed condition of the canister and bolts being illustrated in FIG. 22. The door PD is then inverted, as indicated at I in FIG. 22 so that (as in the inverted position shown at FIG. 23) the worn edge portion 48 becomes the upper edge and the unworn edge portion 44 becomes the lower edge. The ballast canister 114 is also reversed end for end as indicated at R, and it and the buoyancy canister 128 are then reinstalled on the ribs 86, 88 in the manner shown at FIG. 23, following which the reassembled door (as in FIG. 24) is ready for use as a starboard door (and so designated SD in FIGS. 23 and 24). As will be noted, the buoyancy and ballast distribution of the starboard door (FIG. 24) is the same as the buoyancy and ballast distribution that existed in the port door PD (FIG. 21) in that the ballast and buoyancy canisters 114, 128 have changed positions and the centers of buoyancy and gravity have been laterally reversed but have not been shifted longitudinally of the door.

The door of this invention has cost saving and convenience factors of considerable importance since only one type of door need be manufactured—the invertibility of the door permitting one type of door to serve either side. Of equal importance, the vessel need carry only one door as a spare in case of a loss or damage of either standard equipment door while at sea, and the fact that the door ballast can be readily detached also assists in handling the heavy door for storage or replacement.

FIG. 25 illustrates a lateral cross-section of a modified form of door construction incorporating on a flat panel 190 a rubber or like marginal edge 44', 48' and canister type ballasting and buoyancy means similar to the ballast canister 114 and the buoyancy canister 128 of the form of door earlier discussed. The ballast and buoyancy means comprising the canisters respectively indicated at 114' and 128', are constructed identically to the canisters 114 and 118 except that they are mounted directly on the face of the panel 190, suitable respective lugs 192 and 194 being arranged on the canisters 114' and 128' to abut the panel 190 and be secured thereto by respective bolts 196, 198. As will be apparent, the canisters 114' and 128' are invertible in the same manner as the canisters 114 and 128 by the same procedure as illustrated in FIGS. 21–24, being removable from the panel 190 and reinstallable thereon in laterally reversed position by means of the respective bolts 196, 198.

FIGS. 26–29 illustrate a further modified form of door construction according to the present invention. This door comprises a flat panel 200 with rubber or like edging portions 42A, 44A, 46A, 48A, 50A, 52A extending continuously around the edge of the panel 200. The buoyancy means in the door illustrated at FIGS. 26–29 comprises a plurality of individual floats 202, suitably of a type conventional per se and commonly employed as trawl net floats, each of the floats 202 being clamped to one side of the panel 200 by means of a clamping member 204 (shown in enlarged detail at FIG. 29). The clamps 204 comprise a recessed central portion 206 in which a pair of bosses 208 protrude, the M-shaped anchor member 210 of each float 202 nesting around the bosses 208 (as in FIG. 28), with the end ears 212 of each clamp 204 being bolted to the face of the panel 200, by bolts, certain of which are indicated at 214. Rows of holes, certain of which are indicated in FIG. 26 and FIG. 27 at 216, are arranged longitudinally along the door panel 200 to provide interchangeability of lateral position of the various floats 202, one such row of holes being utilized when the edge portion 44' is the upper edge and the other such row of holes being utilized when the edge portion 48' is the upper edge of the door. Said floats 202, as will also be evident, can be used in any desired number to the extent permitted by the number of mounting holes 216 available, and in any arrangement along a row of holes, so that a degree of adjustability is also provided as to the center of buoyancy and extent of buoyancy contributed by the floats 202.

The ballast means employed in the form of door shown at FIGS. 26–29 comprises a plurality of weights 218 in the form of flat bars which can be constituted of lead or cast iron or other heavy metal and which are insulated from the panel by rubber pad 218' and rubber flanged bushing 218" encircling the bolt 220, if the panel 200 and the weights are of dissimilar metals. Said weights 218 can be stacked, in any desired number and can be employed as either a stack set or in a plurality of stacks, each stack being bolted to the door panel 200 just inboard of the panel edging, the manner of mounting suitably involving a plurality of bolts 220, each passing through a longitudinally extending slot 222. The slots 222 enable adjustable placement of the weights longitudinally of the door panel 200 at any desired location. The said slots 222 are provided in laterally opposite rows so that the ballast weight 218 can be reversed in position on the door (along with the floats 202) when the door is inverted.

FIGS. 30–34 illustrate still another form of door embodying certain features of the present invention. In FIGS. 30–34, the door panel 230 is provided with a rubber or like edging 232 extending continuously around the door, the edging 232 preferably being substantially circular in lateral cross-section except along the rear edge where cut outs 234, 236 are provided to reduce drag. The manner of interconnection of the rubber or like edge 232 to the panel 230 is identical to the manner of connection characteristic of the panel-to-edging illustrated at FIG. 7. Ballasting means such as bar 238 is mounted inboard of the lower edge of the door, as shown at FIG. 31, the mounting being by means of a series of bolts 240 arranged in a row of holes 242 (FIG. 32). A laterally opposite row of upper holes 244 permit reverse placement of the ballast means 238 when the door is inverted. The ballast means 238 may comprise a single bar, as shown, or a plurality of stacked bars, or a substitute larger or smaller bar, so as to be a degree adjustable in the manner contemplated by the present invention.

In the form of door shown at FIGS. 30–34, the particular bridle arrangement and hookup arrangements for rigging the door with respect to the towing warp T and the sweep lines SL, and the manner of inverting the bridle assembly, are essentially disclosed in my U.S. Patent No. 3,048,936, and need not be further here described. It is important to note, however, that the form of door shown at FIGS. 30–34 does not require any interchange of edge arranged components, as in the case with the form of door disclosed in said U.S. Patent No. 3,048,936, with the result that the present door is much simpler to adapt for inverted use.

FIGS. 35–38 serve to illustrate a modified form of ballast means which is similar to the ballast means 110 shown at FIG. 2, but incorporates a constructional arrangement by which the total weight of the ballast weight means can be selectively changed as well as shifted longitudinally of the door. More specifically, as shown in FIGS. 35–38, the ballast means 110A comprises a canister 114A having a removable end cap member 250 and an integral end cap member 252. Removal of the end cap 250 permits the ballast weight means 142A, 142B, 142C (three such ballast weight means being shown simply by way of example) to be moved endwise in and out of the canister 114A. As is the case with the ballast means 110, the ballast canister 114A comprises a series of flooding holes 154, selected sets of which can accommodate weight positioning bolts 156, and also respective side lugs 116A, 118A associated with the end caps 252, 250. Said side lugs 116A, 118A are removably mounted on the lateral ribs 86, 88 of the door panel 40 and are arranged outboardly of the ribs 86, 88 in order to permit removal of only the end cap 250 when it is desired to change the number of ballast weight means in the canister 114A.

The construction permitting the removal of end cap 250 from the cylindrical central portion of the canister 114A can be by any suitable arrangement, such as by means of a circumferentially arranged series of lugs 254 on the end cap 250, each of which threadedly receives a bolt 256 passing through a hole 258 in the cylindrical wall of the canister 114A. Respective rubber and metal washers 260, 262 are preferably used with each bolt 256, the function of the rubber washer 260 in each instance being to distribute the bolting stress to the cylindrical surface bolted to the end cap lugs 254.

FIGS. 39 and 40 illustrate a modified form of door and sweep line hookup arrangement, particularly adapted for the situation where a relatively wide door is to be invertible and is to be used with a net where the sweep lines are to be maintained relatively close together and the lower sweep line near-bottom. This is a circumstance commonly involved in Gulf shrimp fishing wherein, for example, a typical sweep line separation distance is about twenty-four inches. With such a net arrangement, such as shown at FIGS. 39 and 40, a net wing W' with bottom contacting tickler chains TC and with sweep lines SL', the sweep line hookup arrangement can involve a door with a panel 40B having a pair of saddles 58A, 58B at one side of the center line C/L of the door, with a further pair of saddles 60A, 60B at the other side of the door. When the door is used as a port door, as shown in FIG. 39, the eyes 62 at the ends of the sweep lines SL' interconnect with the door by passing around the saddles 58B, 60B. Then, when the door is inverted for use as a starboard door, the eyes 62 are moved to the saddles 58A, 60A, as shown in FIG. 40. As will be apparent, a given door design can similarly involve a large number of saddles (e.g. a total of ten for example) along the rear edge of the door, if desired, in order to afford full flexibility as to the hookup arrangement with any desired sweep line arrangement. As will also be evident, the door and sweep line interconnection can involve any desired form of saddle means in appropriate laterally extending pattern, such as the other forms of saddles and associated hookup disclosed at FIGS. 10 and 11, FIGS. 13 and 14, and FIGS. 15 and 16, for example.

FIGS. 41–56 serve to illustrate further typical modifications of the resilient door edging and its manner of interconnection with the edge of the door panel. In the form illustrated at FIGS. 41–45, the metal door panel 40C is equipped with a rubber edging 270 in which is embedded a series of metal tabs 272, each comprising an enlarged embedded bead 274 and an embedded hole 276 in which the rubber edging 270 intrabonds. The protruding portions of each of the tabs 272 comprises a bolt receiving hole 278, preferably configured in the manner shown to receive and non-rotatably retain the head of an associated mounting bolt 280. Preferably, also, the face of the panel 40C is indented at the spaced edge locations which receive the protruding portions of the tabs 272, the said indented areas 282 of the panel 40C being of a configuration to snugly receive the protruding portion of the associated tab 272 and maintain such rigidly so that there is no tendency for the tab to be torn out of the rubber edging 270 as a result of rotation of the tab 272 on the panel 40C.

The rubber edging 270 and its associated tabs 272 can be fabricated with the rubber portion 270 straight and of any desired length, and can then be cut to desired length for installation on the door panel 40C. As shown in FIG. 45, where the attachment of the edging 270 involves a curved corner, the preformed rubber edging 270 simply bends to desired curved configuration at the time of installation.

The further form of rubber edging and associated mounting arrangement shown at FIGS. 46–49 comprises a rubber edging 290 which is of like lateral cross-section throughout and which is therefore formable by extrusion. As best shown in FIGS. 47 and 49, this rubber edging 290 comprises laterally outstanding beads 292, 294 and is radially split between the said beads 292, 294 as indicated at 296. In this form of panel-to-edging assembly, the enlarged peripheral bead 298 of the panel 40D is seated within the radial split 296 of the rubber edging 290 and the edging 290 mounts on the panel 40D by means of a series of opposed pairs of metal clamps 300 bolted or otherwise attached to the door panel 40D in metal-to-metal relation.

In the modified form of resilient edging and panel connection arrangement shown at FIGS. 50–52, the door panel 40E comprises an edge facing 310, of substantial lateral dimension, provided with a series of mounting holes 312. In this arrangement, the rubber edging 314 is preformed with an embedded, longitudinally extending T-bar or like metal anchor member 316 therein. In view of the relatively rigid construction involving a longitudinally continuous anchor member 316, this form of edging is suitably preformed in the longitudinal configuration desired to match the longitudinal configuration of the panel facing 310. As will be apparent, the manner of interconnection of the resilient edging 314 to the panel facing 310 is by a series of bolts 318 passing through holes 320 in the anchor member 316 and through the facing holes 312, with the interconnection being such that a metal-to-metal contact is made between the facing 310 and the anchor member 316. To accommodate placement and non-rotational retention of the bolts 318, the edging 314 is provided with a series of holes 322 through which the bolts 318 are inserted, the associated nuts 324 then being placed inboardly of the facing 310, as best shown in FIG. 52.

FIGS. 53–56 illustrate an edging construction slightly modified from that shown at FIGS. 50–52. In this arrangement, the door panel 40E with its edge facing 310 and mounting holes 312 has attached thereto a rubber edging 314' in which is embedded a series of anchor members 316', the interconnection being by bolts 318' in threaded engagement with the anchor members 316'.

Each of the anchor members 316', as best shown in the detailed view presented by FIG. 56, comprises a threaded boss 330 with a radially extending flange 317', a series of holes 332 preferably provided in the flange 317' to receive and permit intrabonding of the rubber from which the edging 314' is formed. As will be evident, the series of spaced anchor members 316' offer an advantage over the continuous anchor member 316 in that the non-connected arrangement thereof permits a considerable degree of flexure of the edging 314' during installation so that said edging 314' can be fabricated in straight form and curved to fit curved edge contours of the door panel. As will also be apparent, both of the forms of edging assemblies shown at FIGS. 50–52 and at FIGS. 53–56 are advantageous from the point of view of providing a clamped retention of the resilient edging, i.e. portions of the resilient edging are clamped between the metal panel facing 310 and the flange 317 (or 317') of the metal anchor member(s) 316 (or 316').

From the foregoing, various further modifications, arrangements and adaptations of the present invention will occur to those skilled in the art to which the invention is addressed, within the scope of the following claims.

What is claimed is:

1. The method of adjusting the center of balance of a trawl door having a wear edging of rubber-like material extending along at least its lower edge, and adapted to spread the wing of a trawl net while being towed by a trawling vessel with a towing warp on the vessel being led to and towing the door at an angle through the water and along the bottom and with sweep line means being led from the door to the trawl net, said method comprising: operating the door for sufficient time to generate wear on the lower edging thereof; observing such wear to see whether the wear is occurring predominantly in the after portion of the lower edging, or in the forward portion thereof; and changing the center of balance of the door to compensate for uneven wear of said lower edging, such change of the center of balance being realized by shifting a movable ballast means horizontally along a path inboard and adjacent said lower wear edging thereof, the direction of shift of the ballast means being away from the area of greatest wear of the lower edging so as to change the center of gravity and consequently the center of balance of the door so that further wear occurring during subsequent operation of the door is distributed more evenly along the lower edging.

2. In use of a trawl door comprising an adjustable ballast means situated inboard and adjacent one edge of the door, the method of inverting the door to convert same for use on the opposite side of a trawl net towing gear assembly, comprising: removing said ballast means from the door; and remounting the ballast means on the door inboard and adjacent the opposite edge thereof.

3. The method of claim 2, wherein said ballast means consists of a container with weight means longitudinally adjustable therein, and said method comprises: remounting said ballast means inboard of said opposite edge of the door with the same end of the ballast means directed toward the leading end of the door as was directed toward the leading end of the door when the ballast means was mounted inboard and adjacent said one edge of the door.

4. In use of a trawl door comprising a ballast means situated just inboard of a first edge of the door and a buoyancy means situated inboard of the opposite edge of the door, the method of inverting the door to convert same for use on the opposite side of at rawl net towing gear assembly, comprising: removing said ballast means and said buoyancy means from the door; remounting the buoyancy means at a location inboard of the first edge of the door; and remounting the ballast means on the door just inboard of the opposite edge thereof.

5. The method of claim 4, wherein said ballast means consists of a container with weight means longitudinally adjustable therein, and said method comprises: remounting said ballast means inboard of the said opposite edge of the door with the same end of the ballast means directed toward the leading end of the door as was directed toward the leading end of the door when the ballast means was mounted along the first edge of the door.

6. The method of establishing a proper center of balance in a trawl door having a wear assuming edging of rubber-like material extending along at least its lower edge, and adapted to spread the wing of a trawl net while being towed by a trawling vessel, with towing warp means on the vessel being led to and towing the door at an angle through the water; and with sweep line means being led from the door to the trawl net, said method comprising: observing the manner in which wear occurs along the lower edging of the door; and changing the center of balance of the door to compensate for uneven wear by shifting movable ballast means horizontally along a path inboard and adjacent the lower edging, the direction of shift of the ballast weight means being such as to establish the center of balance of the door so that wear occurs more evenly along the lower edging thereof.

7. A bottom trawl door adapted to be towed through the water at an angle and having means to connect the door to a trawl net and to a towing warp, the said door being configured to move through the water in a generally upright position and at an angle of attack with respect to the direction of movement through the water, the said door having an anterior face provided with means for connection thereof to the towing means, the said door having laterally opposed upper and lower edges, said trawl door further comprising ballast means extending generally horizontally inboard and adjacent the lower edge, said ballast means comprising ballast weight means and means by which said ballast weight means is selectively positionable at various locations generally horizontally of the door and on either side of the center of the door.

8. A trawl door according to claim 7, wherein said ballast weight means comprises flat steel bars.

9. A trawl door according to claim 8, wherein said ballast weight means comprises a stack of steel bars mounted on the door, bolt means securing said bars to the doors, with electrically insulative means between the bolt means and the steel bars on one hand and the door on the other.

10. A trawl door according to claim 9, wherein said panel comprises longitudinally extending slot means extending therethrough said panel and receiving said bolt means, the position of the ballast weight means horizontally of the door panel being provided by relative positioning of said bolt means with respect to said slots.

11. A trawl door according to claim 7, wherein said ballast means comprises a canister of generally cylindrical configuration and generally cylindrical weight means movable axially within the canister, the canister being mounted in fixed location on the door and having a substantial portion thereof on each side of the door's center.

12. A trawl door according to claim 11, wherein said canister has a series of openings, by means of which the canister becomes flooded when the door is submerged in water and by means of which said weight means positioning means can be located at selected points along the length of the canister to retain said weight means at a desired location within the canister.

13. A trawl door according to claim 12, wherein said weight means has an outside dimension just slightly smaller than the inside dimension of said canister, and said positioning means comprises a pair of bolts extending from one side of the canister to the other closely adjacent the ends of said weight means, with the said bolts clamping said weight means within said canister.

14. A trawl door according to claim 11, wherein said weight means comprises a body of lead sealed within an aluminum shell.

15. A trawl door according to claim 11, wherein the door and said canister are fabricated of aluminum.

16. A trawl door provided with ballast means adjustable fore and aft on the door, said ballast means comprising a canister of generally cylindrical configuration and weight means including a heavy, generally cylindrical body movable axially within the canister, the canister being mounted in fixed location on the door, rearwardly of the posterior surface of the door.

17. A trawl door according to claim 16, wherein said canister has a series of openings, by means of which the canister becomes flooded when the door is submerged in water, and said ballast means further includes positioning means positionable in said openings at selected points along the length of the canister to retain said weight means at a desired location within the canister.

18. A trawl door according to claim 17, wherein said weight means has an outside dimension just slightly smaller than the inside dimension of said canister, and said positioning means comprises a pair of bolts extending from one side of the canister to the other closely adjacent the ends of said weight means, with the said bolts clamping said weight means within said canister.

19. A trawl door according to claim 17, wherein said weight means comprises a body of lead and an aluminum shell covering said body of lead.

20. A trawl door comprising a water reaction body arranged to move substantially horizontally through the water when towed by a trawling vessel and in turn towing a trawling net, the said trawl door comprising ballast means secured along the lower portion of the door, and further comprising buoyancy means extending generally horizontally and along the upper edge of the door, the said buoyancy means being secured and arranged so that the center of buoyancy of the trawl door can be shifted by varying the horizontal placement of said buoyancy means on said door.

21. A trawl door according to claim 20, wherein said buoyancy means comprises a row of buoyancy units extending horizontally, each such buoyancy unit being individually mounted on the door.

22. A trawl door comprising a water reaction body, ballast means comprising a series of weight units mounted in the lower portion of said body, means for selectively varying the number of weight units to increase or decrease the weight of said ballast means, and means for selectively changing the location of said weight units horizontally with respect to said body.

23. A trawl door according to claim 22, further comprising a canister containing said weight units, the said canister having a removable part of a size to permit addition and removal of weight units to and from the canister.

24. A trawl door according to claim 23, wherein said door body comprises laterally extending ribs and said canister comprises laterally extending lug means removably mounted to said laterally extending ribs, the said removable portion of said canister comprising a removable end cap carrying a portion of said lug means, and the the said lug means on the removable end cap being arranged outboardly of the rib to which said lug means mounts in order to permit removal of only the end cap when it is desired to change the weight units in the canister.

References Cited
UNITED STATES PATENTS

| | | | |
|---|---|---|---|
| 1,440,854 | 1/1923 | Vigneron | 43—9 |
| 2,942,371 | 6/1960 | Johnson et al. | 43—9 |
| 3,048,936 | 8/1962 | Luketa | 43—9 |

FOREIGN PATENTS

| | | |
|---|---|---|
| 634,289 | 2/1928 | France. |
| 1,050,338 | 9/1953 | France. |
| 24,241 | 10/1899 | Great Britain. |

WARNER H. CAMP, *Primary Examiner.*